United States Patent
Kashiyama et al.

(10) Patent No.: US 6,400,999 B1
(45) Date of Patent: Jun. 4, 2002

(54) PRODUCTION SYSTEM AND MANUFACTURING EQUIPMENT SELECTING METHOD ON PRODUCTION SYSTEM

(75) Inventors: Yuichi Kashiyama; Hidehiko Wada; Yuichi Sakuraba; Toshiharu Yamakawa; Masako Negishi; Akira Nagashima, all of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/340,847

(22) Filed: Jun. 28, 1999

(30) Foreign Application Priority Data

| Jul. 6, 1998 | (JP) | 10-190086 |
| Jul. 16, 1998 | (JP) | 10-201736 |
| Jul. 16, 1998 | (JP) | 10-201739 |
| Aug. 6, 1998 | (JP) | 10-222902 |

(51) Int. Cl.$^7$ ................................ G06F 19/00
(52) U.S. Cl. ............... 700/100; 700/95; 700/101; 700/110; 705/28
(58) Field of Search ............... 700/19–21, 95, 700/100–102, 117, 96, 99, 108, 121; 705/28

(56) References Cited

U.S. PATENT DOCUMENTS

| 5,237,508 A | * | 8/1993 | Furukawa et al. | 364/468 |
| 5,249,120 A | * | 9/1993 | Foley | 364/401 |
| 5,469,361 A | * | 11/1995 | Moyne | 364/468 |
| 5,550,735 A | * | 8/1996 | Slade et al. | 364/401 R |
| 5,777,876 A | * | 7/1998 | Beauchesne | 364/468.01 |
| 5,991,528 A | * | 11/1999 | Taylor et al. | 395/500.27 |
| 6,000,830 A | * | 12/1999 | Asano et al. | 700/100 |
| 6,188,402 B1 | * | 2/2001 | Csipkes et al. | 345/336 |
| 6,216,051 B1 | * | 4/2001 | Hager, III et al. | 700/82 |
| 6,263,255 B1 | * | 7/2001 | Tan et al. | 700/121 |

* cited by examiner

Primary Examiner—Thomas Black
Assistant Examiner—Crystal J Barnes
(74) Attorney, Agent, or Firm—Moonray Kojima

(57) ABSTRACT

A production system wherein product agents are provided for products on a one-to-one basis and machine agent are provided for manufacturing equipment on a one-to-one basis, with the product agents and machine agents coordinating with each other to select a manufacturing equipment and cause manufacturing work to be done thereby; wherein the order of product manufacturing is changed depending on the priority of the product in the production system, with manufacturing work by a failed manufacturing equipment by suppressed, and another manufacturing equipment being substituted for the failed manufacturing equipment; wherein a precedence agent is provided that selects a manufacturing equipment ahead of a current manufacturing work and a backward agent is provided that remains backward and double manages working history along with the product agent; and wherein the machine agent manages depreciation information regarding the manufacturing equipment that the machine agent manages and measures the time the manufacturing equipment is used by the product agent, and the machine agent also calculates the cost generated by use of the manufacturing equipment by the product agent using the depreciation and time used information.

23 Claims, 23 Drawing Sheets

PRODUCTION SYSTEM AND MANUFACTURING EQUIPMENT SELECTING METHOD ON PRODUCTION SYSTEM

BACKGROUND OF THE INVENTION

1. Field of Invention

This invention relates to a production system that produces desired products by executing manufacturing work with a predetermined production sequences and to a manufacturing equipment selecting method in such production system.

2. Description of the Prior Art

FIG. 1 shows a conventional production system, wherein products before manufacturing P1 are sent to transfer line 1, manufactured with manufacturing equipment 2 and 3, and P2 and P3 are the final products. The same final products may be manufactured in such a manner in large quantities. Controllers 4 and 5 control manufacturing equipment 2 and 3, respectively. In the FIG. 1 production system, final products are manufactured by moving the raw products on a production line according to a procedure determined in advance. The processing programs and data are stored in each of the manufacturing equipment and specified processing is carried out by such equipment. For this reason, the production system shown in FIG. 1 is suitable when the same processing is repeated for many products, such as for the mass production of small products.

However, disadvantageously, the FIG. 1 system has various problems, such as: (1) controllers 4 and 5 use specific control programs. Thus, when the process is to be changed or different processing needs to be executed for each product, all of the control programs must be changed. Accordingly, it is difficult to change manufacturing processes in a flexible manner. Moreover, because of this lack of flexibility, it is difficult to handle small scale production of multiple products. (2) addition of new manufacturing equipment or deletion of existing manufacturing equipment is not easy. and (3) when some of the manufacturing equipment fail, the manufacturing work cannot be readily executed using another manufacturing equipment having the same function.

SUMMARY OF THE INVENTION

Accordingly, an object of the invention is to overcome the aforementioned and other disadvantages, deficiencies and problems of the prior art.

Another object is to provide a production system and a manufacturing equipment selecting method for such production system that can flexibly achieve small scale production of multiple products, handle addition and/or deletion of various manufacturing equipment, and handle failures in the manufacturing equipment.

DETAILED DESCRIPTION OF THE PREFERRED EMBODIMENTS

First Embodiment

Figure 1:
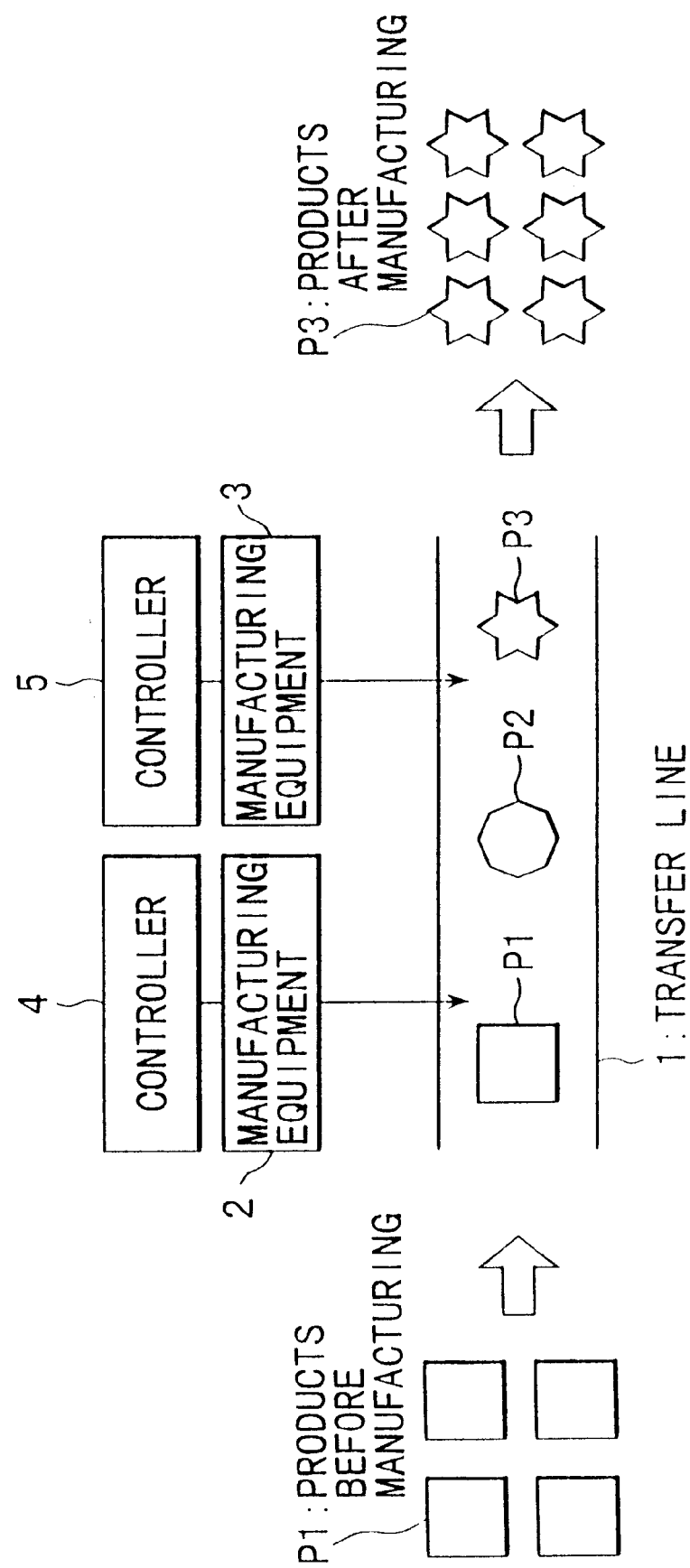
FIG. 1 is a diagram depicting a conventional production system.
Figure 2:
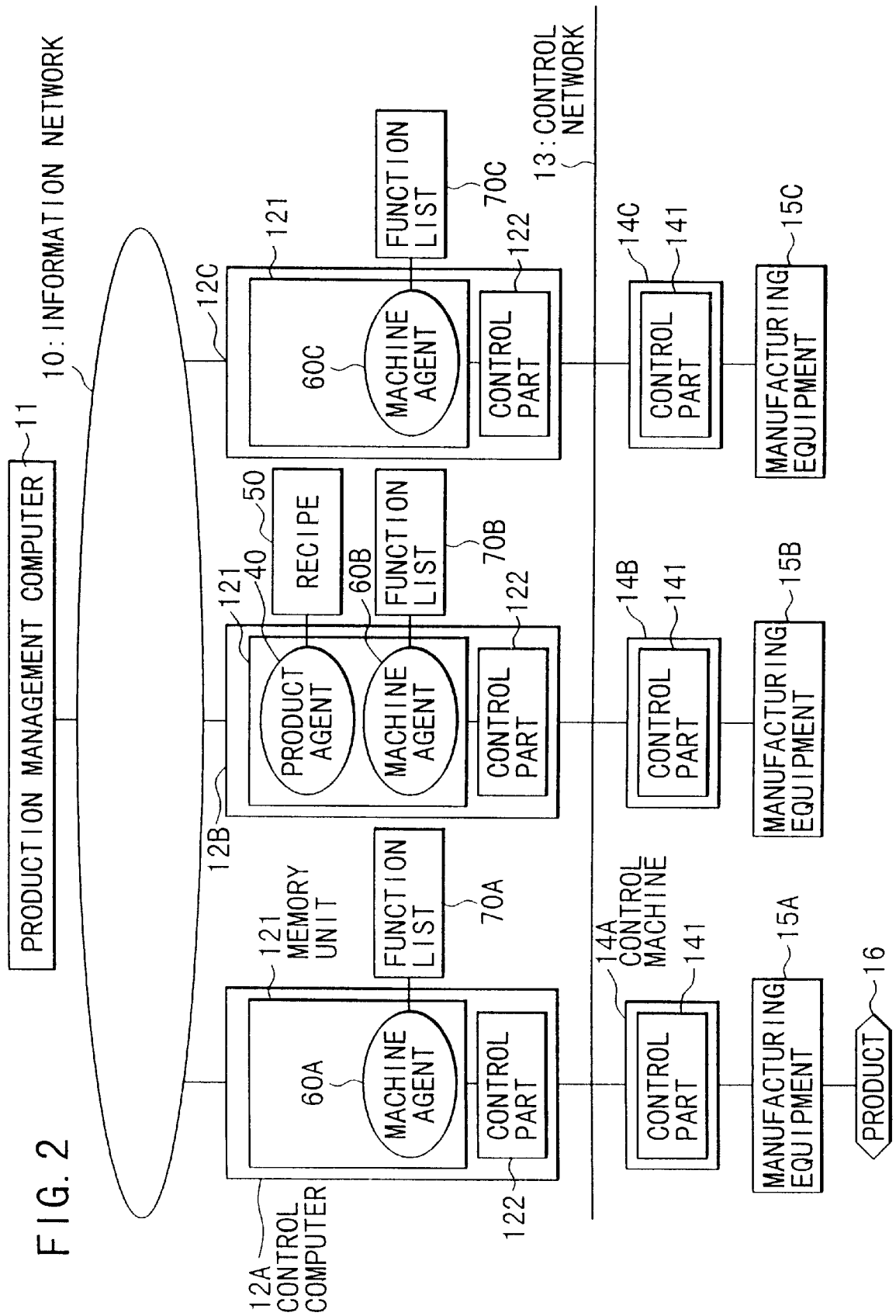
FIG. 2 is a diagram depicting a first illustrative embodiment of the invention.

FIG. 2 shows a first illustrative embodiment wherein production management computer 11 and control computers 12A,12B,12C are connected to information network 10. Production management computer 11 manages the types of manufacturing product in the production lines, the number of each type of manufacturing products, and the like, and transfers the foregoing information to control computers 12A, 12B, 12C.

The configuration is described hereunder by taking control computer 12B as an example. In control computer 12B, memory unit 121 is provided for each control computer and supplies the working areas for product agent 40 and machine agent 60. Control part 122 manages the control function of control computer 12B. Product agent 40 is provided for a product corresponding to a one-to-one basis and has recipe 50 that shows the manufacturing procedure for the product. Product agent 40 autonomously moves from one control computer to another according to a sequence written in recipe 50. In the FIG. 2 example, product agent 40 exists in control computer 12B.

Each line of recipe 50 corresponds to an instruction of the manufacturing work for the manufacturing equipment and comprises a pair of [function name, machine or manufacturing work instruction]

The function name indicates which manufacturing equipment can process the specified work. Examples of function names include presses, lathes, etc. The machine or manufacturing work instruction indicates the contents of the instructions supplied to the manufacturing equipment. In a recipe, pairs of function name and machine work instructions are arranged in the order of the work. Other control computers 12A and 12C have similar configurations. More than three control computers may be used.

Control computers 12A,12B, 12C and control machines 14A,14B,14C are connected to control network 13. Control computers 12A,12B,12C handle control machines 14A,14B, 14C, respectively. Control machines 14A,14B, 14C are functionally equivalent to programmable logic controllers (PLC) and send actual operational commands according to the description in the ladder programs, etc, to the manufacturing equipment 15A,15B, 15C as desired. Manufacturing equipment 15A,15B, 15C represent, for example, presses, lathes, grinding machines, etc. In control machines 14A, 14B, 14C, control part 141 manages the control function of control machines 14A,14B, 14C.

Machine agents 60A, 60B, 60C are provided for manufacturing equipment 15A,15B,15C on a one-to-one basis and have function lists 70A,70B, 70C indicating the function that the corresponding manufacturing equipment can process. Machine agents 60A, 60B, 60C communicate with control part 141 of the corresponding control machine 14A,14B,14C, respectively, and cause the control machines to perform the control functions. For example, each of the machine agents 60A, 60B, 60C communicate with each control part of the control machines 14A,14B, 14C, respectively, and cause the control machine to perform the control function. The function list is a list specifying the work that the manufacturing equipment corresponding to each machine agent can handle.

Product 16 is manufactured according to a manufacturing sequence.

Figure 3:
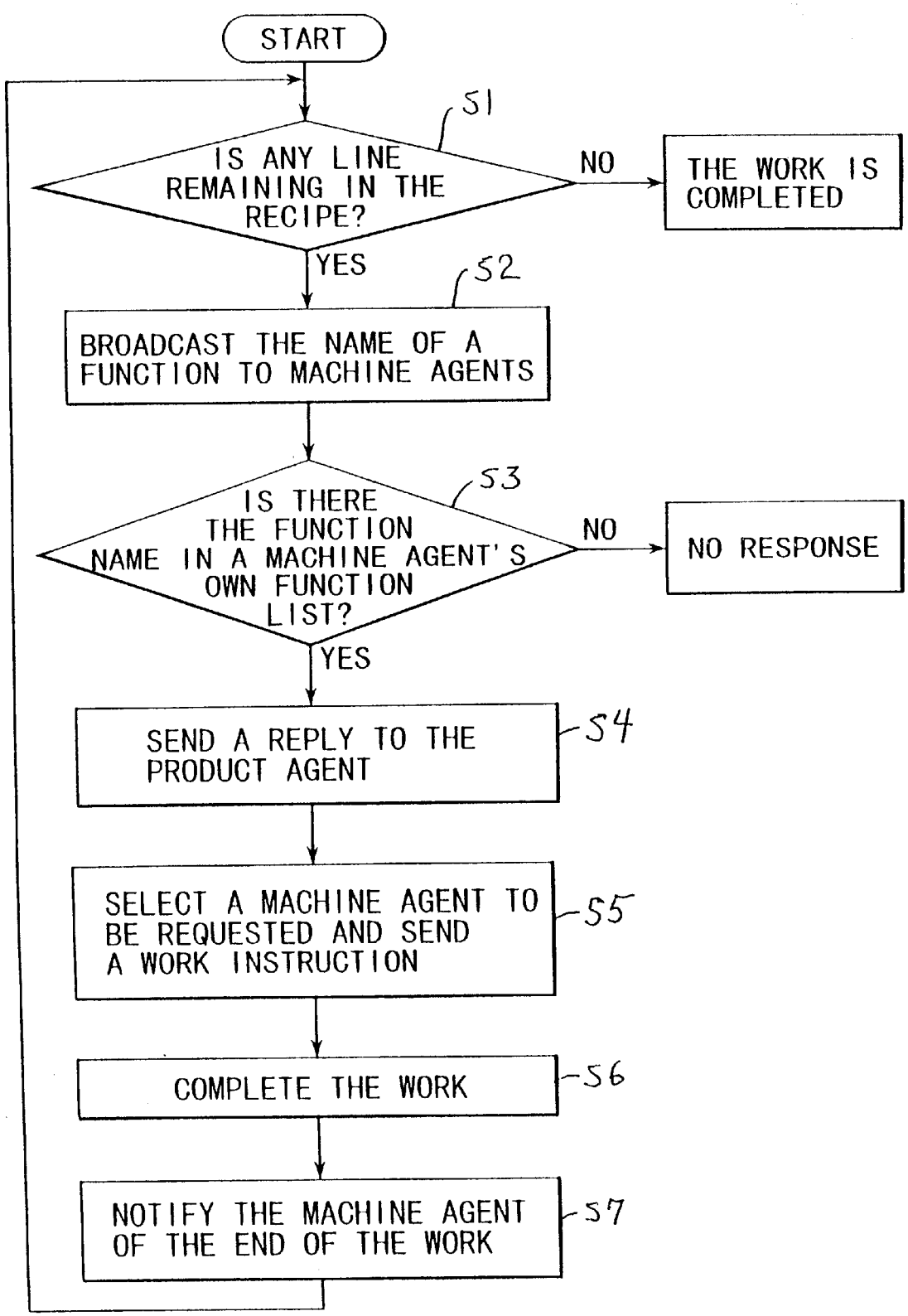
FIG. 3 is a flow chart depicting operation of the first embodiment of FIG. 2.

Operation of the system of FIG. 2 will now be described with reference to FIG. 3 which is a flow chart showing the following operational sequence:

(S-1) Product agent 40 reads a line from recipe 50 and finds the function name written in that line.

(S-2) The product agent broadcasts the function name to the machine agents to search for the manufacturing equipment having the function name.

(S-3) A machine agent sends a reply of the existence of the function name to the product agent when the broadcasted function name exist in its own function list.

(S-4) The product agent waits for replies from the machine agents for a predetermined period. When the predetermined period has expired, the product agent selects a machine agent to which work is to be actually requested from among the machine agents that have replied to the product agent.

(S-5) The product agent requests the selected machine agent to execute the machine work instruction paired with the function name.

(S-6) The machine agent executes and completes the work corresponding to the machine work instruction upon receiving such work instruction When the work is completed, the machine agent informs the product agent of completion of the work.

(S-7) The product agent selects the manufacturing equipment for requesting the work corresponding to the next line of the recipe when the machine agent notifies the product agent of the completion. If no line remains in the recipe, the work is terminated and the production of the product is completed.

Although the foregoing description applies to the case where the product agent broadcasts the function name to all the machine agents, the function name may be multicast to specific machine agents only. If a function is implemented by some (e.g. more than one) of the manufacturing equipment, the system may be configured such that the machine agent controls and monitors the manufacturing equipment. Even in such a case, the operation from the product agent side can be identical to the case where the machine agent corresponds to the manufacturing equipment on a one-to-one basis.

In addition, the machine agent may also exist not only in the control computer but also in the control machine. In this case, a memory unit that supplies the working area for the machine agent is provided in the control machine. Moreover, the system may be configured in such a manner that a managing computer is provided on control network 13 and that the product agent reside in the managing computer without movement and requests manufacturing work by communicating with the machine agents in the control computers.

Figure 4:
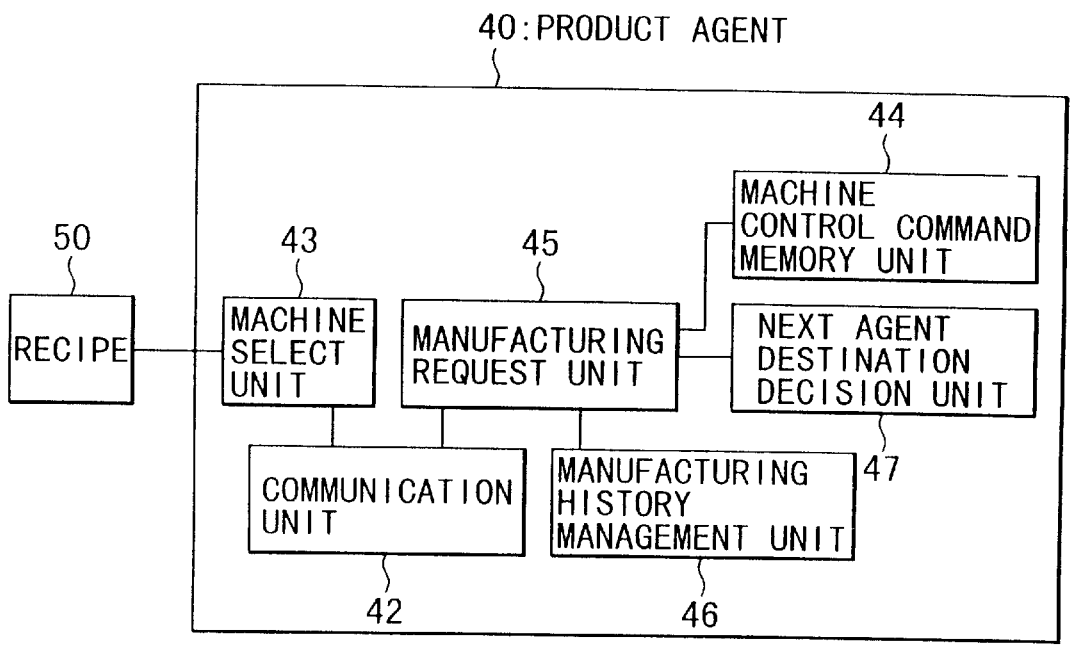
FIG. 4 is a block diagram depicting details of a product agent.

FIG. 4 shows details of the structure of the product agent 40, wherein communication unit 42 implements communication between various product agents, communication between the product agent and machine agents, etc. Machine select unit 43 selects a manufacturing equipment to which the manufacturing work or processes are requested. Machine control command memory unit 44 stores the machine control command in a suitable form for the desired manufacturing equipment. Manufacturing request unit 45 sends manufacturing work requests to a manufacturing equipment. Manufacturing work is requested by reading the machine control command corresponding to the requested work from machine control command memory unit 44, and providing the control command to the machine agent. Manufacturing history management unit 46 manages the manufacturing history of the products. Next agent destination decision unit 47 decides the next destination of the product agent.

Figure 5:
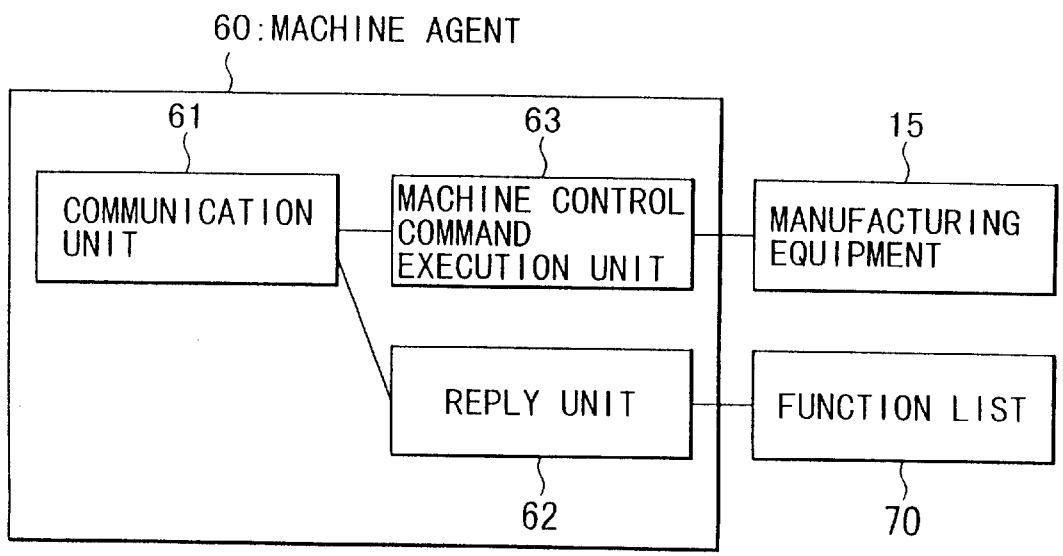
FIG. 5 is a block diagram depicting details of a machine agent.

FIG. 5 shows details of the structure of the machine agent, wherein communication unit 61 implements communication between the product agent and the machine agent,etc. Reply unit 62 decides whether the function name included in the manufacturing request from the product agent exists in the function list, and if such function name exists, returns a reply to the concerned product agent. Machine control command execution unit 63 executes the machine control command provided by the product agent and causes the manufacturing equipment 15 to execute the manufacturing work or process.

The first embodiment provides the following advantages and effects:

(1) Since the manufacturing sequence is provided to the product agent, the manufacturing sequence of the product can be provided immediately before the manufacturing work. This enables rapid adaptation of the manufacturing line to small scale production of multiple products or individual production of each discrete product.

(2) Since the manufacturing equipment is determined dynamically, it is not necessary to change the software to operate the system even when one or more manufacturing equipment are temporarily added or deleted.

(3) Since the manufacturing equipment is determined dynamically, when one of the manufacturing equipment fails, another manufacturing equipment having the same function can be substituted for the failed one and thus continue executing the manufacturing work.

(4) The manufacturing request can be provided to specific ones of the manufacturing equipment rather than to all of the manufacturing equipment by multicasting the manufacturing request to specific machine agents only. This enables the system to reduce the traffic on the net work.

(5) A machine agent can control a group of manufacturing equipment when one function is realized with the group of manufacturing equipment. This enables the system to request work in the same manner as viewed from the product agent as in the case where each manufacturing equipment realizes one function, even when a group of manufacturing equipment realizes only that one function.

(6) Manufacturing work can be requested clearly to the manufacturing equipment by describing the manufacturing sequence in a recipe which describes a pair of function name and machine work instruction in each stage of the manufacturing work or process.

(7) Manufacturing work can be requested even if the product agent does not move, in the case where the product agent is provided in the managing computer without movement and such product agent requests manufacturing work by communicating with the machine agent in the control computer.

Second Embodiment

Figure 6:
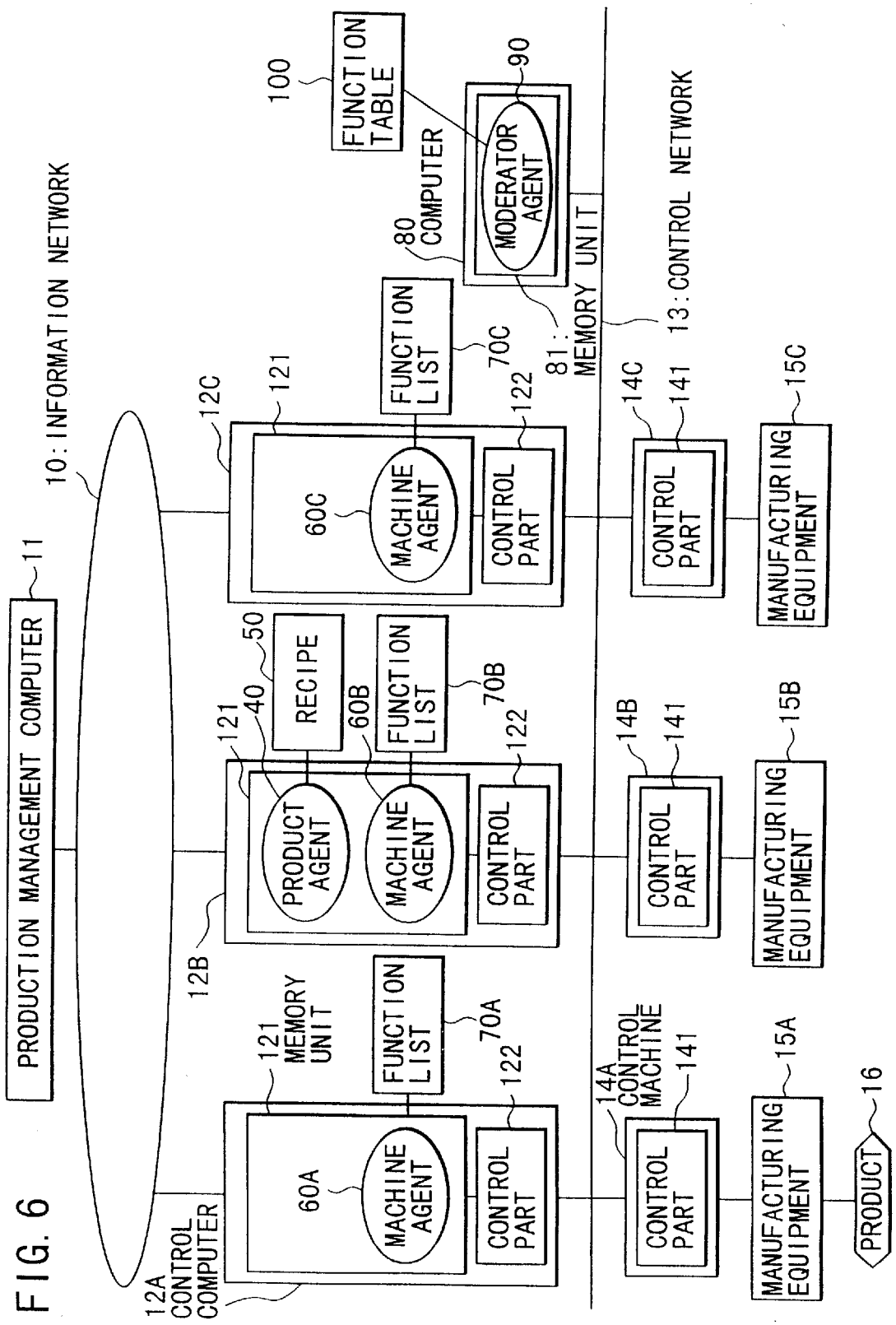
FIG. 6 is a diagram depicting a second illustrative embodiment of the invention.

FIG. 6 shows a second illustrative embodiment wherein computer 80 is, for example, a personal computer and is connected to control network 13. Memory unit 81 supplies a working area of moderator agent 90 which has function table 100 that performs integrated management of the information on the functions for all of the manufacturing equipment. Moderator agent 90 also functions to control transfer devices carrying products to the manufacturing equipment. Moderator agent 90 registers the functions of the added manufacturing equipment in function table 100 when a manufacturing equipment is newly added. When a manufacturing equipment is deleted due to failure or other reason, moderator agent 90 deletes the corresponding function from the function table 100.

Figure 7:
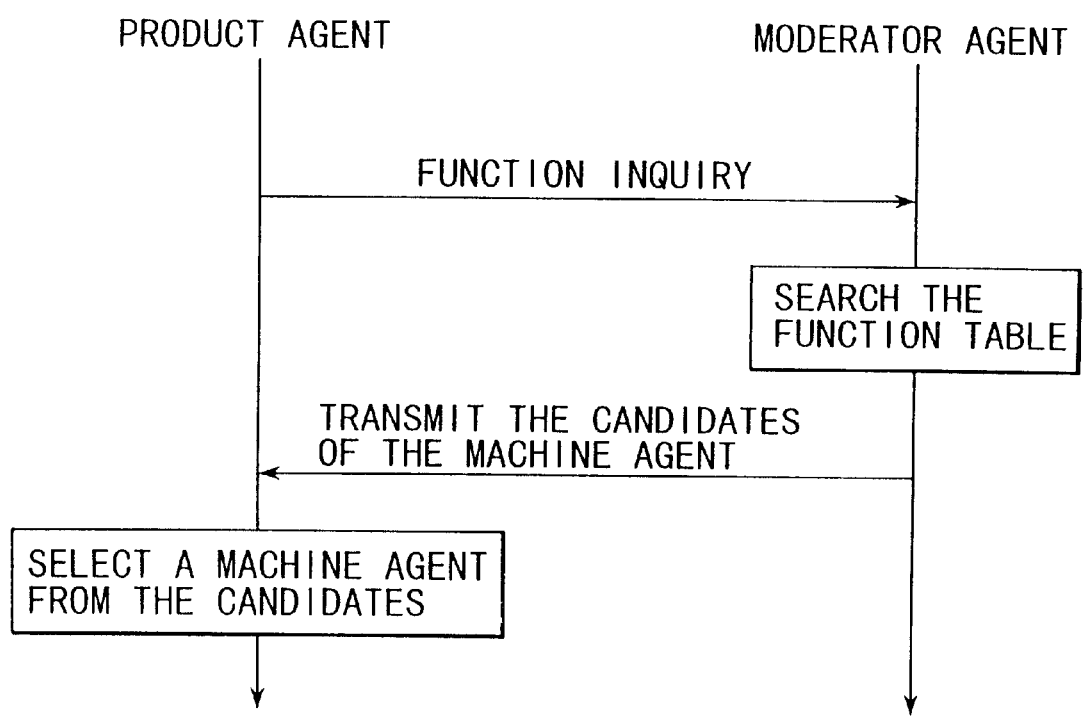
FIG. 7 is a diagram depicting an operational sequence of the second embodiment of FIG. 6.

Operation of the system of FIG. 6 will now be described with reference to FIG. 7 which shows the following operational sequence of the FIG. 6 system:

(1) Product agent 40 reads a line from recipe 50 and finds the function name written in that line.

(2) Product agent 40 sends an inquiry message including the function name to moderator agent 90 to search which manufacturing equipment has the function name.

(3) Moderator agent 90 searches the function name written in the message in function table 100. In this case, the position of the product agent is also considered if necessary.

(4) As a result of the search, a candidate machine agent is selected. Two or more candidates may be selected in certain cases.

(5) Moderator agent 90 sends a message of the candidate machine agent to the appropriate product agent. There are communication methods e.g. broadcasting, multicasting, group communication, etc, for sending the message, and an optimum-communication method should be used.

(6) Product agent 40 selects an optimum machine agent from among various candidate machine agents.

The second embodiment provides the following advantages and effects:

(1) Since the embodiment centralizes manufacturing information the response to manufacturing work request is faster.

(2) The information on functions can be easily updated for adding or deleting a manufacturing equipment.

(3) The quantity of messages between agents is reduced.

Third Embodiment

Figure 8:
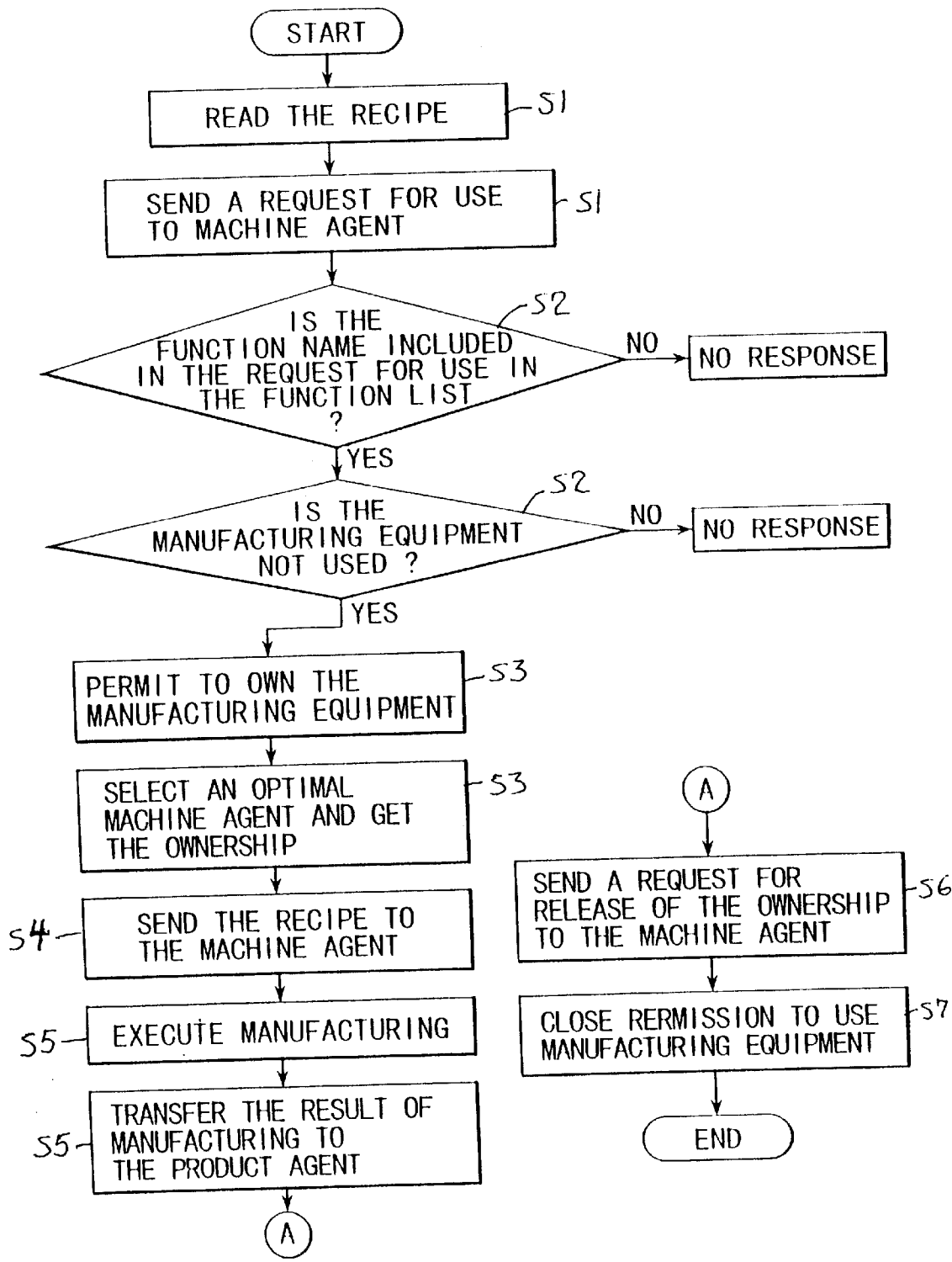
FIG. 8 is a flow chart depicting operation of a third illustrative embodiment of the invention.

FIG. 8 shows steps in a manufacturing equipment selecting method, wherein the manufacturing equipment is selected using the concept of ownership, namely:

(S-1) The product agent reads a recipe, finds the required function name, and sends a request to machine agents to use the selected manufacturing equipment.

(S-2) The machine agents that receive the request for use permit the product agent to use the manufacturing equipment when the specified function in the request for use exists in the function list and the corresponding manufacturing equipment is not used.

(S-3) The product agent selects the optimum machine agent among the product agents that are permitted to Own and use the manufacturing equipment. The product agent acquires the ownership.

(S-4) The product agent that has acquired ownership sends the recipe to the machine agent. The number of lines of the recipe received by the machine agent is determined by the processing function of the manufacturing equipment corresponding to the machine agent. If the manufacturing equipment has more than one function, the number of lines in the received recipe may be two or more lines.

(S-5) The machine agent interprets the recipe, controls the corresponding manufacturing equipment and causes it to execute the manufacturing work. The machine agent sends the results of the manufacturing work to the product agent.

(S-6) The product agent sends a request for release of the ownership to the machine agent.

(S-7) The machine agent closes the permission of the corresponding manufacturing equipment.

In accordance with the third embodiment, optimum coordination among the product agents of the use of the manufacturing equipment is achieved because the ownership is provide to the product agent.

Fourth Embodiment

Figure 9:
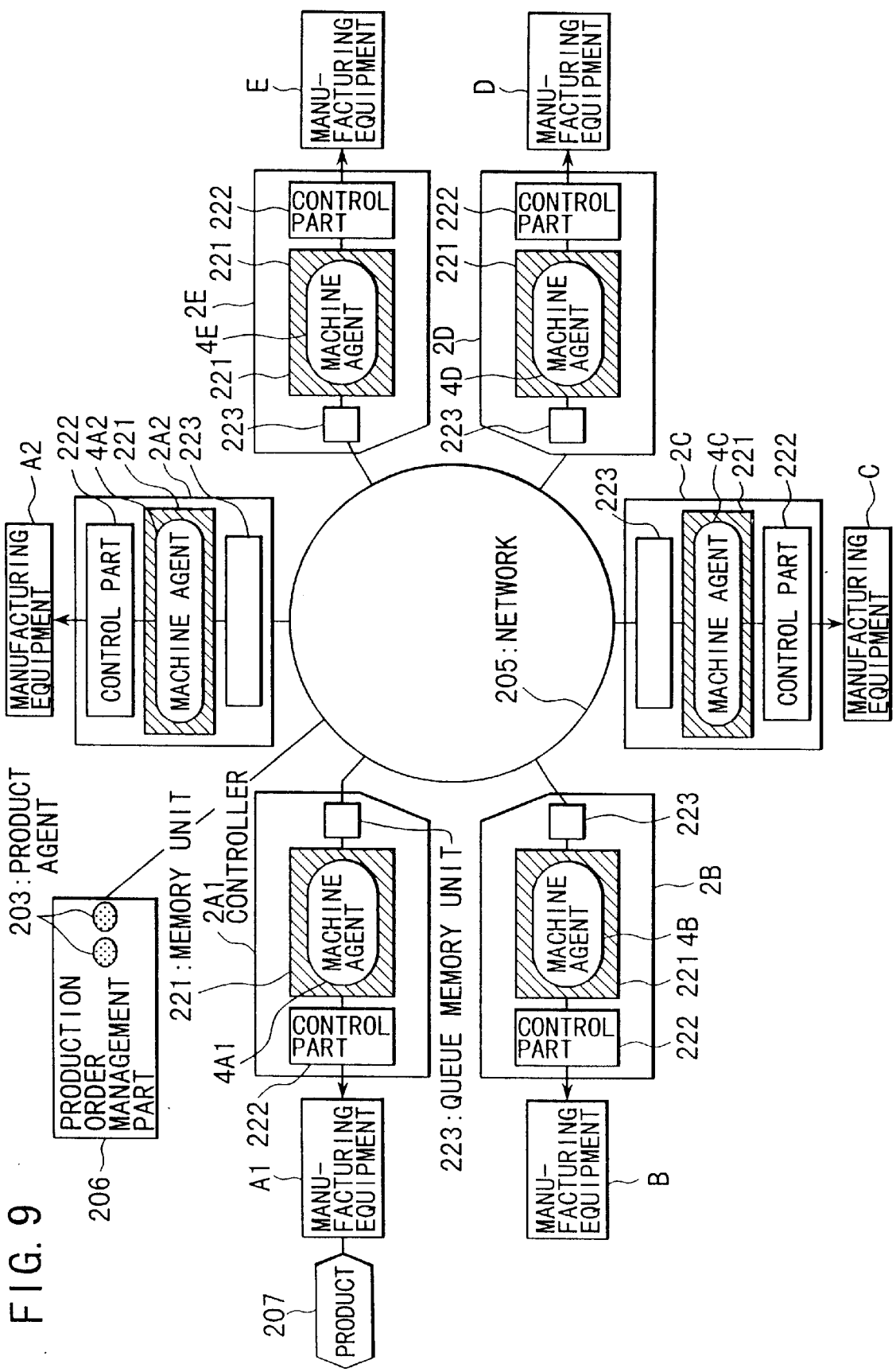
FIG. 9 is a diagram depicting a fourth illustrative embodiment of the invention.

FIG. 9 shows a fourth illustrative embodiment, wherein six units of manufacturing equipment A1,A2 and B–E are provided. Manufacturing equipment A1 and A2 have the same function. Controllers 2A1,2A2 and 2B to 2E are connected to the manufacturing equipment A1,A2 and B–E, respectively. Although each manufacturing equipment is connected to each controller in the embodiment of FIG. 9, more than one manufacturing equipment may be connected to one controller. Memory unit 221 is provided in each controller and supplies the working area for product agent 203 and each one of the machine agents 4A1, 4A2 and 4B–4E.

Control part 222 is provided in each controller and manages the control function of the controller. Machine agents 4A1, 4A2 and 4B–4E communicate with control part 222 and causes each controller to execute the control function. Queue memory unit 223 provides an area in which a reservation agent is queued. The reservation agent will be described later. Controllers 2A1, 2A2 and 2B–2E and product order management part 206 are connected to network 205. Production order management part 206 communicates with each controller via network 205 to manage production of the products.

Production order management part 206 also creates product agent 203. Normally, product agent 203 is automatically created according to the schedule of production. Recipe and other information are specified for the products. Otherwise, production order management part 206 creates product agent 203 when so instructed by the operator. Similar to product agent 203, production order management part 206 also has a communication function and can receive notification, such as "the manufacturing equipment having this function cannot be used due to a failure". Product agent 203 has a recipe specifying the production sequence for the product, selects a manufacturing equipment necessary for the manufacturing work according to the recipe, and requests the controller to which the selected manufacturing equipment is connected to perform manufacturing work. If the product agent detects a failure or congestion at the concerned manufacturing equipment, the agent informs the production order management part 206 of such status.

Machine agent 4A1, 4A2 and 4B–4E are provided for manufacturing equipment A1, A2 and B–E on a one-to-one basis. Each machine agent has its own specific information on the corresponding manufacturing equipment, such as what type of manufacturing work can be done by that manufacturing equipment, and controls that manufacturing equipment.

Product 207 is manufactured according to the production sequence.

The operation of the system of FIG. 9 is as follows: Product agent 203 sends a message to the various machine agents to select the manufacturing equipment according to the recipe by asking the machine agents whether the manufacturing work is possible or not. The product agent moves to the controller with which the machine agent is working and requests manufacturing work when permission is received from a machine agent to use one of the manufacturing equipment. Accompanied by this movement, a product itself is moved to that manufacturing equipment corresponding to the machine agent from which the product agent has received permission for use.

After the requested work is completed at the destination of movement of the raw product along the line, the product agent searches for a manufacturing equipment that is to be used in the next production sequence. Repetition of the foregoing procedure leads to completion of the final product.

In addition, the product agent can also search and reserve a manufacturing equipment required for a later stage of the production sequence.

If the manufacturing equipment required for the next manufacturing step is being used, the product agent waits for manufacturing work until a message of permission for use is sent. In this case, the product agent may reserve a group of manufacturing equipment that have identical functions, as seen in manufacturing equipment A1 and A2, to select the first one that becomes available.

Figure 10:
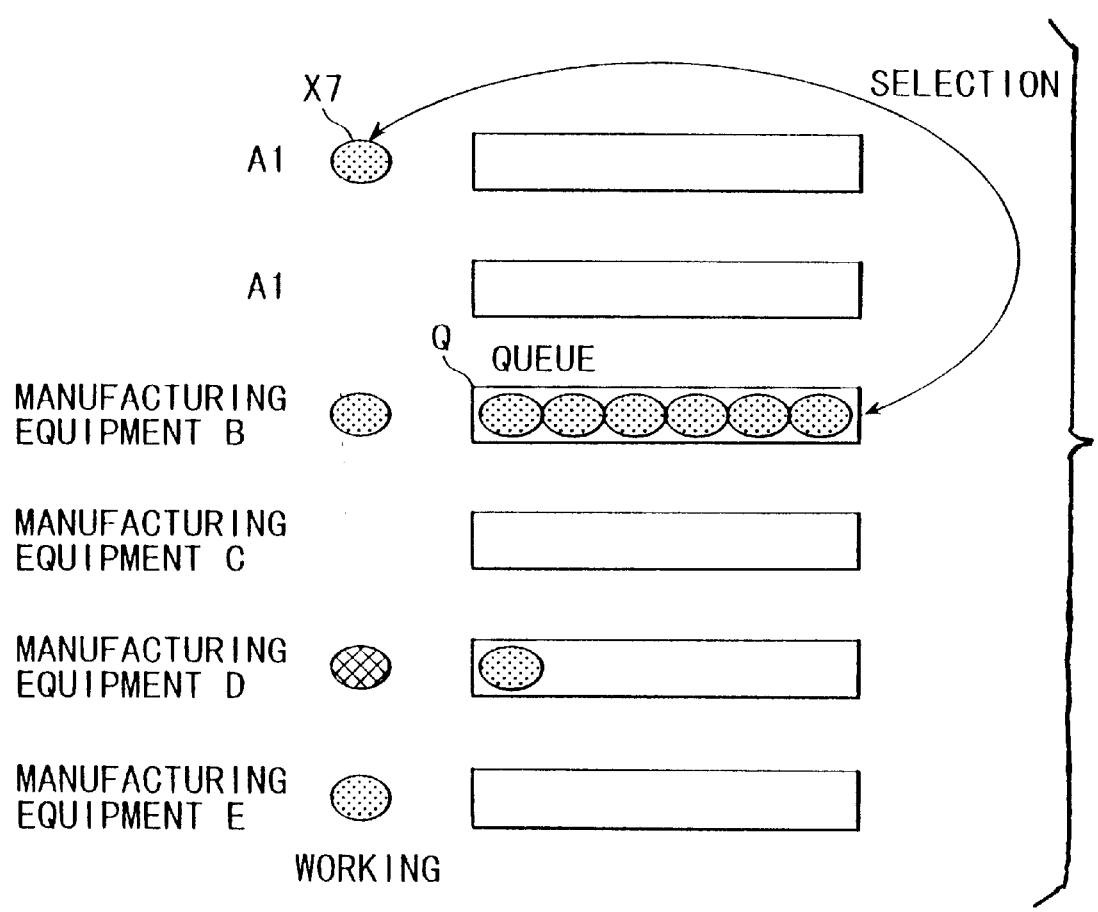
FIG. 10 is a diagram depicting operation of the fourth embodiment of FIG. 9.

FIG. 10 illustrates the reservation status of various manufacturing equipment, wherein the product agent waiting in a queue takes a reservation for manufacturing equipment B now in use. Actually, a reservation agent is waiting in chequeue. The reservation agent is an agent that reserves the manufacturing equipment prior to the current manufacturing work.

If the required manufacturing equipment cannot be found, the product agent sends an error message and waits for a specified time. As described, while the product agent waits for manufacturing process, the product remains at the manufacturing equipment or waiting area at the preceding stage of the production sequence. The product agent communicates with the machine agents or other product agents to obtain information on the degree of congestion of the manufacturing equipment from the number of reservations or expected processing time. The product agent also has information on the failures of the manufacturing equipment, or the like via broadcast messages from the management agent.

Figure 11:
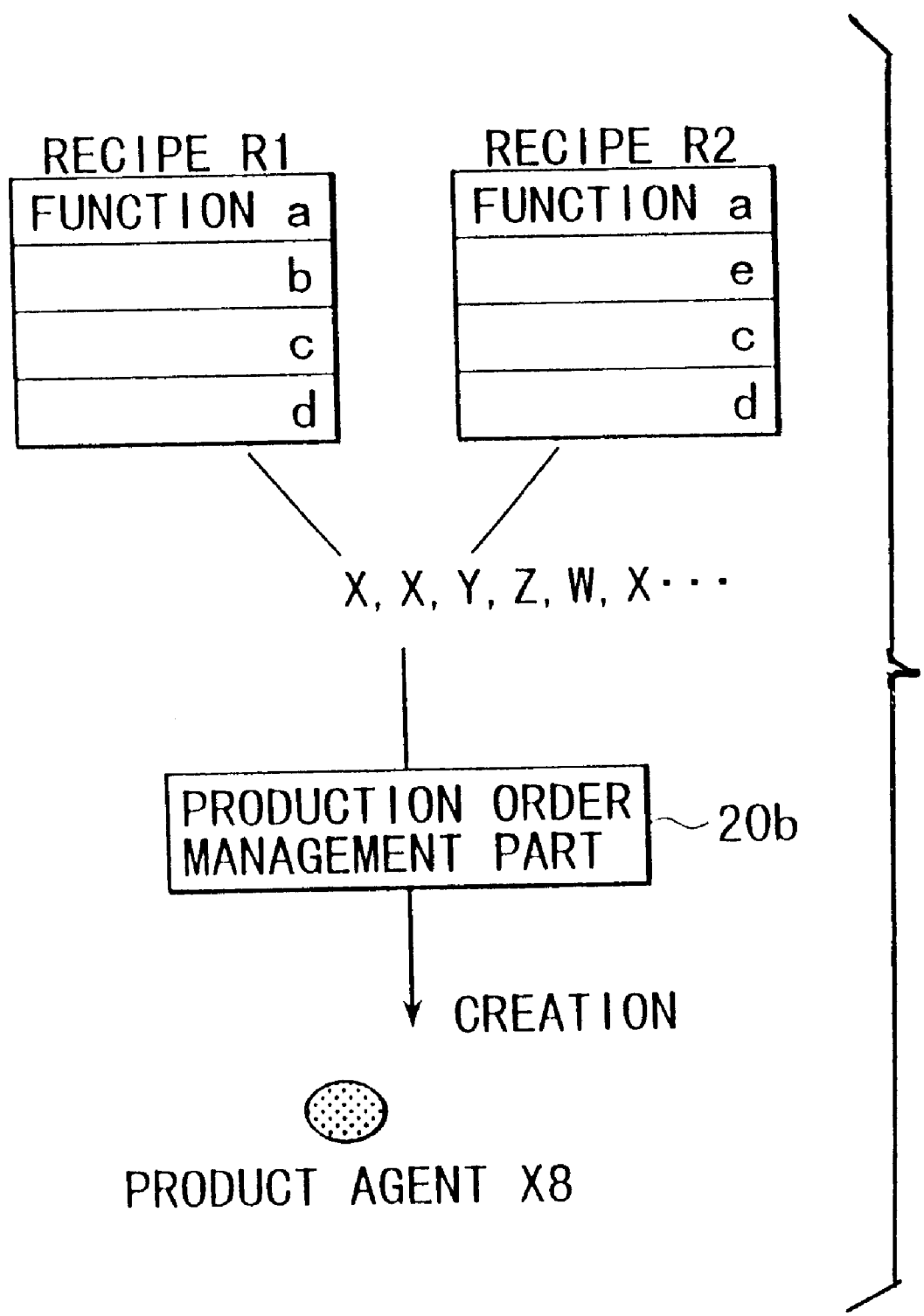
FIG. 11 is a diagram depicting operation of the fourth embodiment of FIG. 9.

FIG. 11 shows the creating of the product agent, wherein in recipes R1 and R2, functions required for manufacturing of each product sequence are described. Manufacturing equipment A1 or A2 realizes function "a" and manufacturing equipment B, C, D and E execute functions "b", "c", "d", and "e", respectively. Product X is manufactured according to recipe R1 and product Y is manufactured according to recipe R2. A recipe is also prepared for each of products X and W. The specified schedule of production is in the order of products X,X, Y, Z, W, X . . . The recipe is prepared in that order. Normally, production order management part 20*b* creates product agents following a specified schedule.

Returning to FIG. 10, product agent X7 finishes manufacturing work at manufacturing equipment A1 and searches for another manufacturing equipment having the next required function "b". Product agent X7 checks queue Q at the manufacturing equipment B and if product agent X7 decides that manufacturing equipment B is congested from an analysis of the number of reservation agents in the queue and the scheduled processing time, product agent X7 notifies production order management part 20*b*, of FIG. 11, of the "congestion of function 'b'". After receiving the notification, the product order management part 20*b* suppresses the creation of the products that have function "b" in the recipe, and provides high priority to products that do not have the function "b" in the recipe. In the example shown in FIG. 11, creation of product X is suppressed and product Y is placed into the system earlier than product X.

The product agent not only detects failures or congestion in selecting of the reserving of the manufacturing equipment, but also has knowledge of failures or abnormalities in the manufacturing equipment from notification thereof by other product agents. In addition, even though there may be no problem existing when a particular product agent makes a reservation by being first in the queue, a reservation made by another product agent having a higher priority may break the queue, which would result in congestion. When congestion or failure exists, or is about the exist, the product agent will coordinate its own reservation schedule, as discussed below.

When product agent X0 detects that the manufacturing equipment which is required at a later stage of sequence S1 does not exist or is congested, the product agent will delay the procedure before reaching stage S1. For example, the product agent will provide its reservation of the manufacturing equipment required in the procedure before stage S1 to another product agent that can proceed forward with its production process. That is, the reservation made by the product agent X0 is replaced with the reservation made by another product agent that is queued at the back of the product agent. Moreover, product agent X0 can delay the reservation made for the procedure after stage S1. The digit after X and S are examples only and can be 0 to N.

A product agent that has not yet started actual production work, e.g. product agent X8 in FIG. 11, also has similar functions, and, if it detects congestion or failure of the manufacturing equipment, it does not start production work until production can proceed smoothly.

The fourth embodiment provides the following advantages and effects:

(1) Backlog of a number of products to be produced and waiting for manufacturing work at a congested or failed manufacturing equipment or subsequent production of defective products can be effectively prevented.

(2) Products that need not use the congested or failed manufacturing equipment can be effectively routed to avoid using such congested or failed manufacturing equipment.

(3) A pile up of parts used for production due to lack of manufacturing equipment can be detected and dealt with accordingly, thereby increasing efficiency.

Fifth Embodiment

Figure 12:
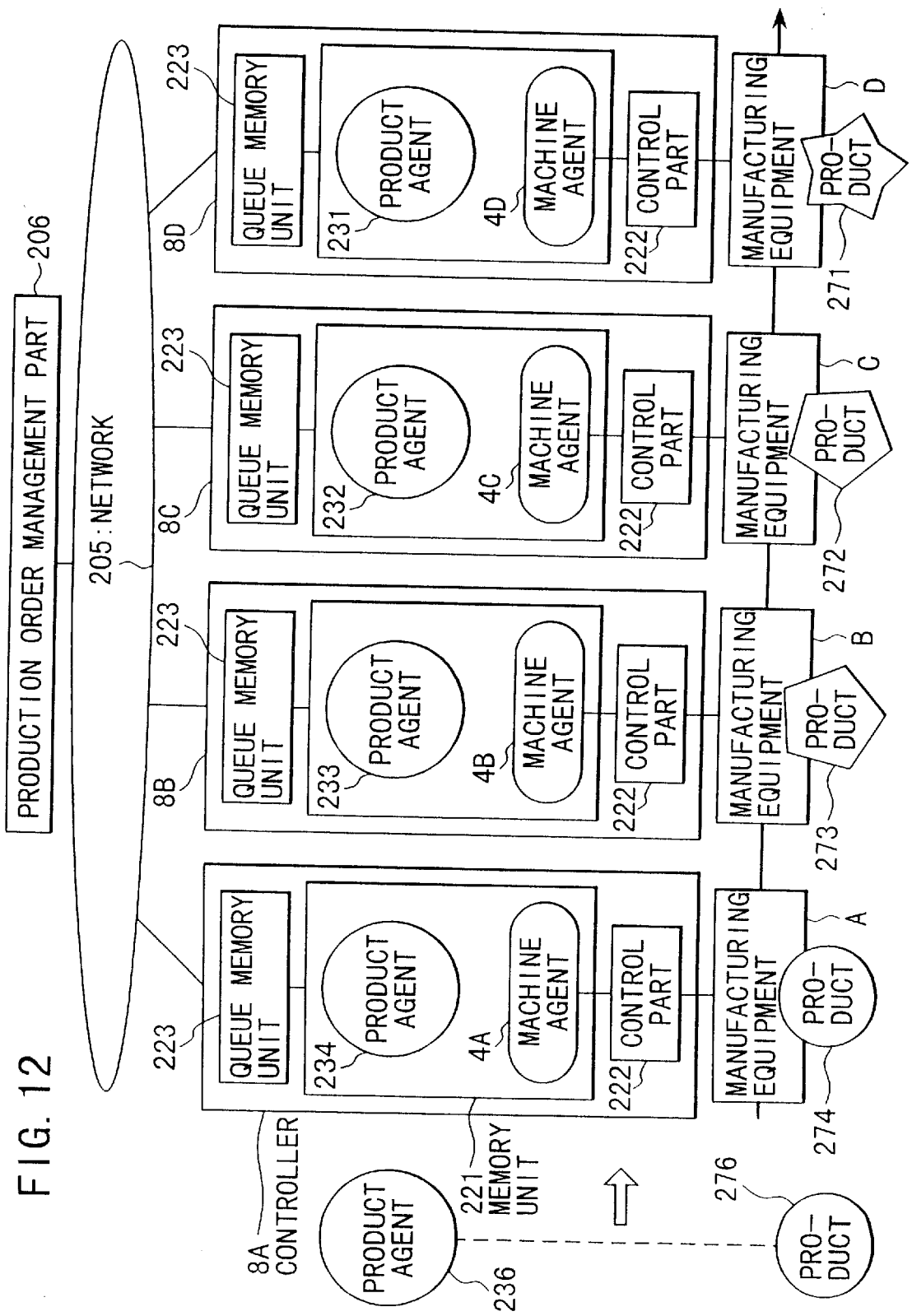
FIG. 12 is a diagram depicting a fifth illustrative embodiment of the invention.

FIG. 12 shows a fifth embodiment wherein machine agents 4A,4B,4C and 4D correspond to manufacturing equipment A,B,C and D, respectively. Product agents 231, 232, 233 and 234 correspond to product 271,272, 273 and 274, respectively. In FIG. 12, it is assumed that product agents 231, 232, 233 and 234 have the production sequence for the same products and manufacturing is done in the order of manufacturing equipment A–B–C–D. Controllers 8A–8D are connected to network 205 and control manufacturing equipment A–D. However, each product agent dynamically searches for and selects a manufacturing equipment that has the required functions for the manufacturing work. In this manner, it is also possible for the product agent to read ahead of the production sequence and reserve a particular manufacturing equipment.

The manufacturing equipment may be reserved either by a method wherein the machine agent manages a queue of the reservation agents, or a method wherein the reservation agents are queued for a group of manufacturing equipment, each group member having the same functions. In either method, the reservation agents can change their order in the queue according to their own priorities.

The product agents. 231, 232, 233, and 234 have the following functions:

(1) Priority.

(2) ordering information, such as delivery date, and product information, such as serial number.

(3) Production sequence for products. The machine agents are reserved and selected according to the desired sequence.

(4) Movement of a product to a manufacturing equipment together with movement to a controller in which the corresponding machine agent exists.

(5) Acquisition and management of production history.

(6) Communication with other product agents.

(7) Communication for the order of production, such as (7-1) Inquiry of priority.

(7-2) Inquiry on whether the production sequence is the same or not. Otherwise, the product agents having the same production sequence may be searched for using broadcasting communication.

(7-3) Negotiation between production agents, such as replace of reservation or change mapping with products.

Figure 13:
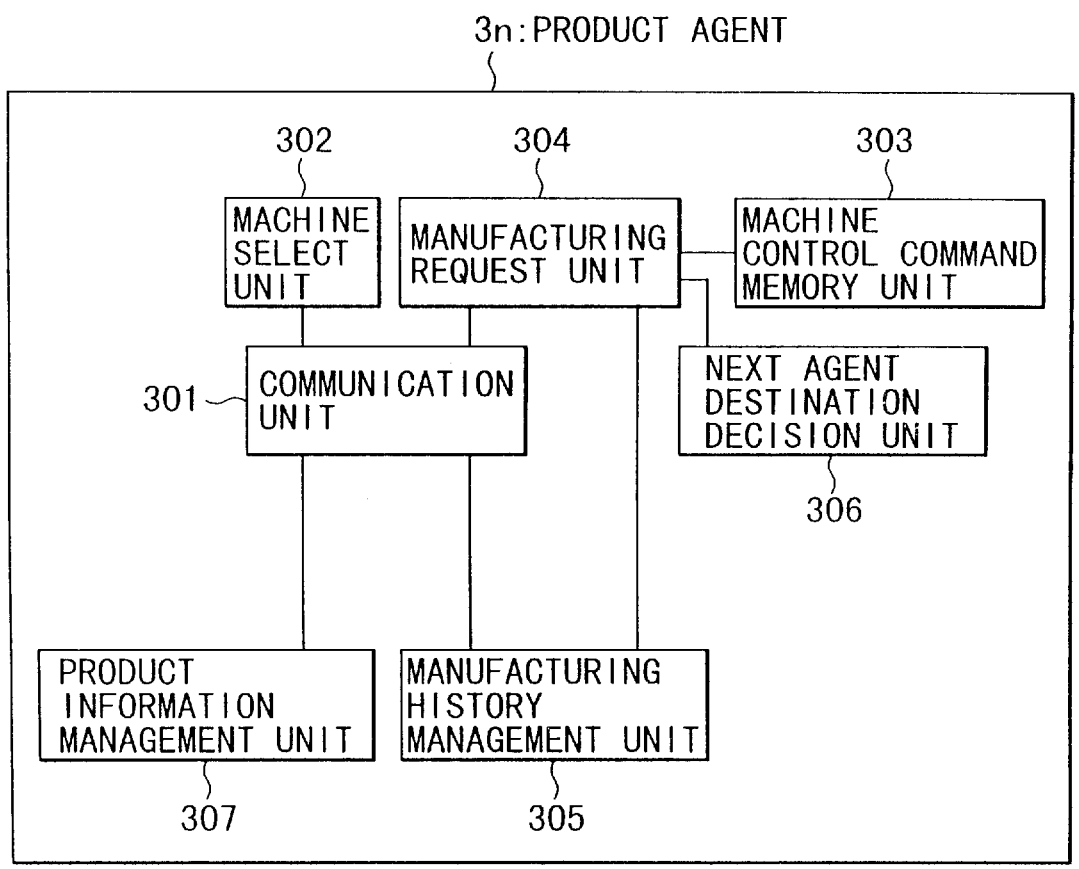
FIG. 13 is a block diagram depicting details of the product agent shown in FIG. 12.

FIG. 13 shows details of the structure of the product agent of FIG. 12, wherein in product agent 3n, communication unit 301 implements communication between product agents or between a product agent and a machine agent, etc. Machine select unit 302 selects one of the manufacturing equipment required in a production sequence. Machine control command memory unit 303 stores machine control commands in a suitable form for the manufacturing equipment. Manufacturing request unit 304 requests a manufacturing equipment to carry out manufacturing work. Manufacturing work is requested by reading the machine control command corresponding to the work from machine control command memory unit 303 and by providing the machine control command to a machine agent. Manufacturing history management unit 305 manages the manufacturing history for a product. Next agent destination decision unit 306 determines the next moving destination of the agent. Product information management unit 307 manages ordering of information, such as priority and delivery date, and of product information,including serial number.

Figure 14:
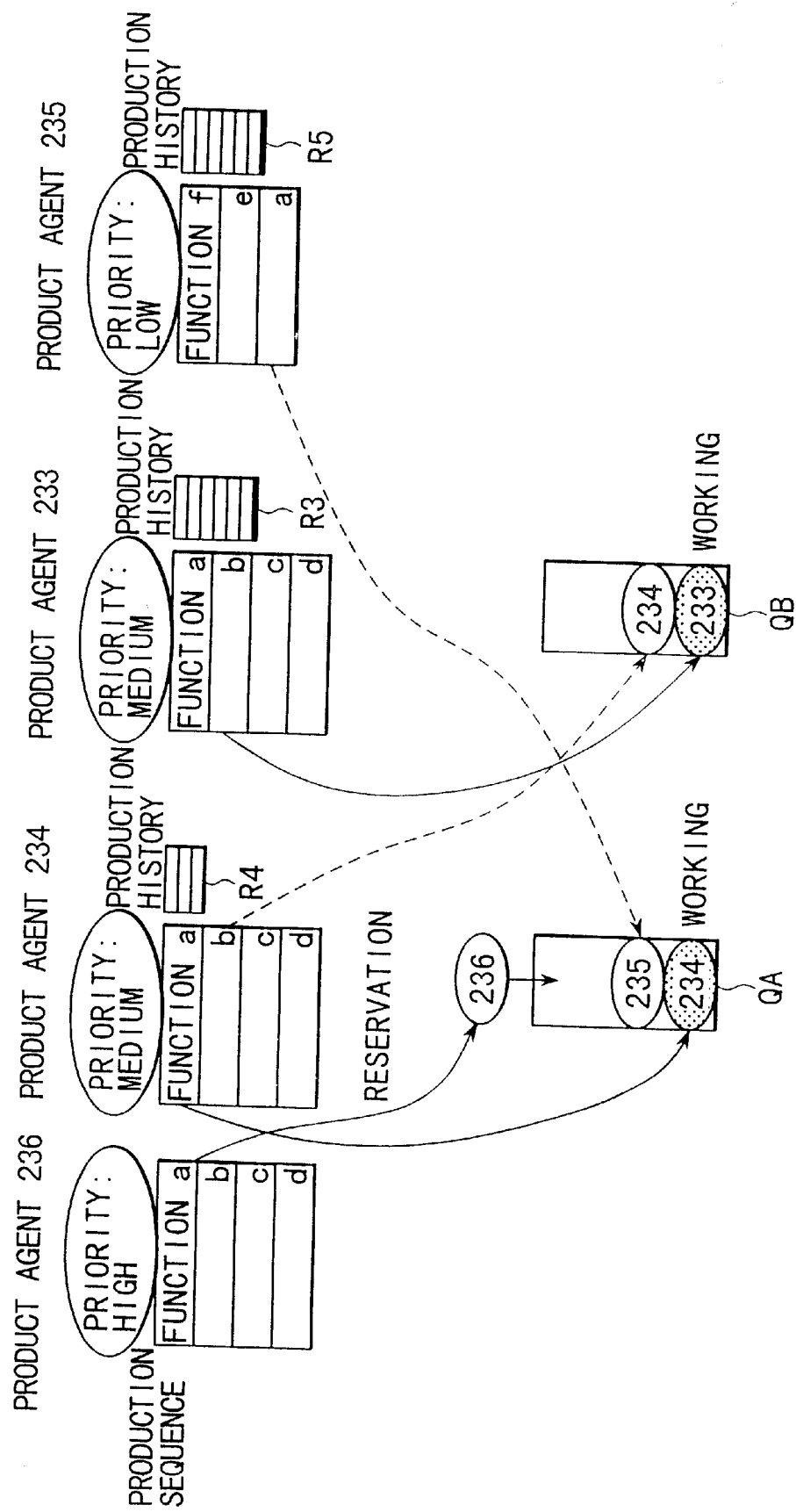
FIG. 14 is a diagram depicting operation of the fifth embodiment of FIG. 12.

Operation of the FIG. 12 embodiment is described with reference to FIG. 14, which shows an example of a reservation queue provided for each manufacturing equipment.

Product agents 233–236 search for and reserve a manufacturing equipment having functions required for the next stage of the current manufacturing work. The reservation agent (not the product agent per se) is queued for reservation. For example, product agent 234 dynamically searches for the manufacturing equipment having function "b" required for the next stage of the production sequence and selects manufacturing equipment B. This is done while the corresponding product to product agent 234 is being manufactured by manufacturing equipment A, and the reservation agent makes a reservation in queue QB in the controller corresponding to manufacturing equipment B. Product agent 234 has "medium" priority and holds the production history R4 up to this stage of production. The production histories R3 and R5 are similarly held up.

Figure 15:
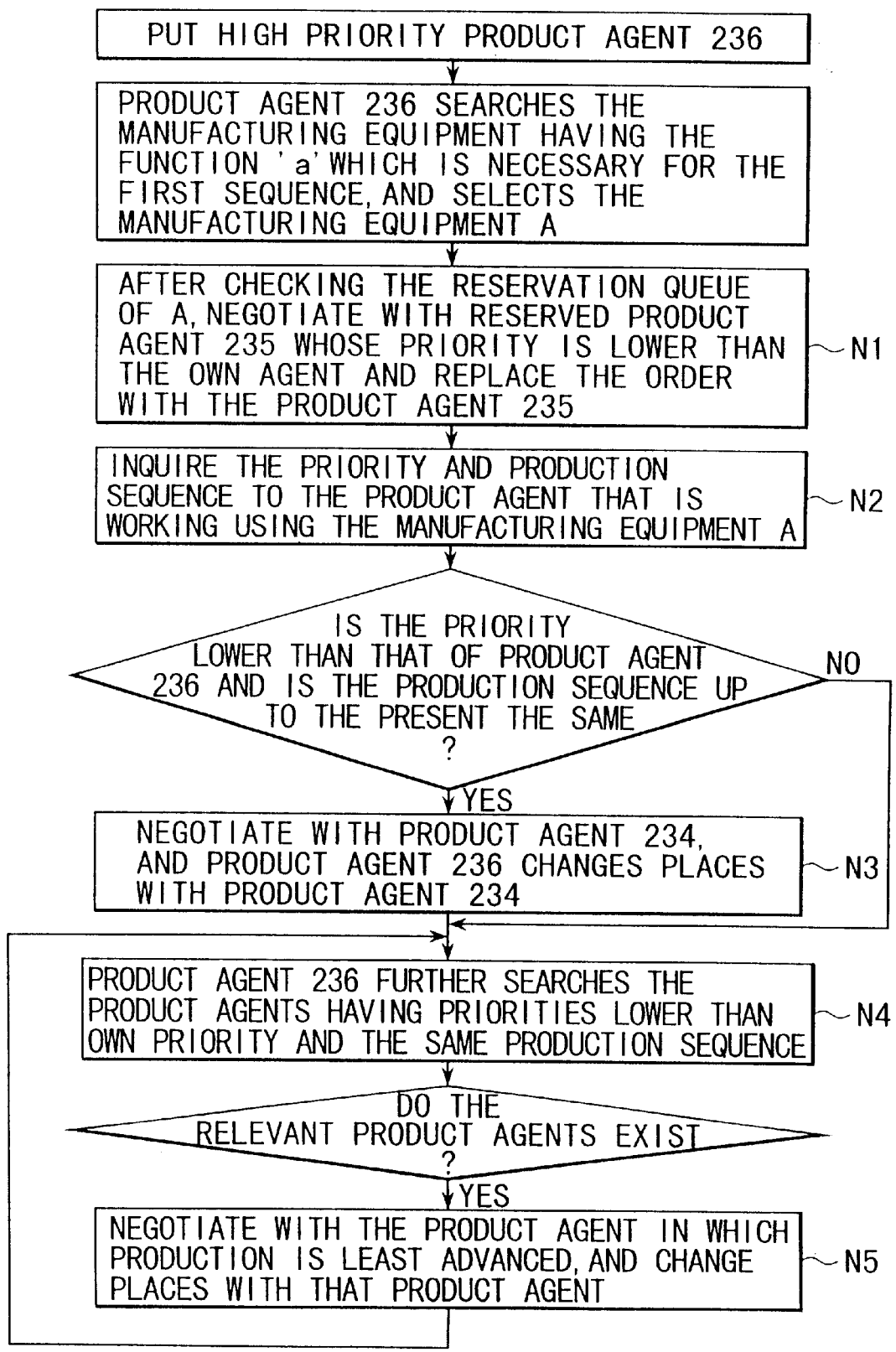
FIG. 15 is a flow chart depicting operation of the fifth embodiment of FIG. 12.

When high priority product agent 236 is operated (See FIG. 14), the operations are as shown in FIG. 15. When a high priority product agent is operated, the order of production is changed to cause production by the high priority product agent to precede production by lower priority product agents. In FIG. 15, the of order of production is changed using the following two types of methods:

(1) A method whereby the order of reservation is replaced by the product agent. This is shown as processing N1 in FIG. 15. For example, in FIG. 14, manufacturing work by product agent 236 is preceded by placing the reservation of "high" priority product agent 236 before that of "low" priority product agent 235 that was queued in an earlier position in queue QA for manufacturing equipment A.

(2) A method whereby the product agents themselves are replaced. This is shown as processing N3 and N5 in FIG. 15. "Over-taking" production is possible by changing the correspondence of product agent to product. Replacement between product agents is done by replacing the production sequence, product information, etc., while leaving the production history and manufacturing equipment reservation unchanged, if, for example, product agent entities are not changed. For example, in FIG. 14, manufacturing work for product agent 236 is preceded by replacing the correspondence of product agent to product between high priority product agent 236 and low priority product agent 235 (see N4). For a product which is advanced for manufacturing work, if the production sequence is the same up to that stage, the product agents themselves may be replaced.

The foregoing two methods (1) and (2) can be combined depending on the arrangement of facilities or priorities in the production system. In a production system using agents, a product can be freely transferred to a manufacturing equipment that is dynamically selected. However, even for a facility where the products flow on a conveyor belt where over-taking of products is not possible., over-taking process using replacement between the product agents themselves is effective. In addition, if the difference between priorities of products is small, only the reservation order of manufacturing equipment need be changed without the over-taking process.

In the case of over-taking, a target product agent for replacement is searched in the reservation queue for the selected manufacturing equipment shown as N2 in FIG. 15 and the product agents may be asked as the target individually. Another way, as shown in FIG. 15 is for a target agent for replacement to be searched for using broadcasting communication.

In FIG. 12, if the high priority product agent 236 (with the product corresponding to product agent 236 being product 276) having the same sequence as product agents 231 to 234 is placed into the system, product agent 236 overtakes the other product agent one after another. Finally, product agent 236 corresponds to product 271 and product agent 234 corresponds to product 276. That is the product agents have been interchanged vis-a-vis the corresponding product.

The fifth embodiment provides the following advantages and effects:

(1) For a preceding product which has the same production sequence up to the current stage, since the product agents themselves may be replaced, production in the order of priority can be readily achieved. Also, for a job having higher priority, over-taking production process can be used even if the production line is otherwise fixed.

(2) The manufacturing equipment can be dynamically selected and reserved for several stages in advance.

Sixth Embodiment

Figure 16:
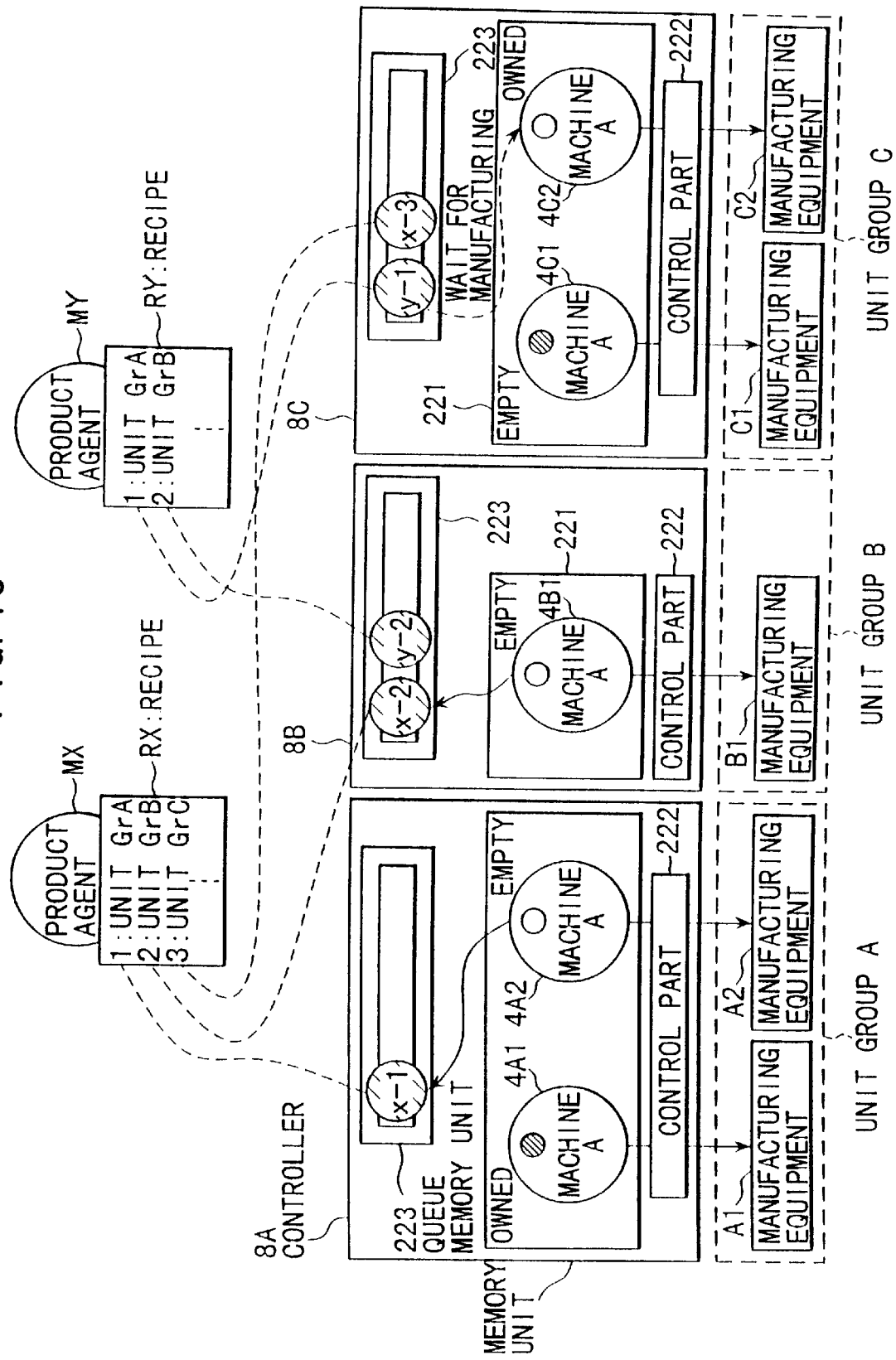
FIG. 16 is a diagram depicting a sixth illustrative embodiment of the invention.

FIG. 16 shows a sixth embodiment wherein product agents MX and MY have a message communication function and advance processing by exchanging messages. Product agents MX and MY can create reservation agents that select and reserve the required manufacturing equipment for each manufacturing procedure in each recipe RX and RY. In the example shown in FIG. 16, product agent MX creates reservation agents x-1, x-2, x-3, . . . , and product agent MY creates reservation agents y-1, y-2, . . . Controllers 8A–8C control unit groups A–C, respectively.

A reservation agent has the following information:

(1) Part of a recipe.

This is a unit for reserving manufacturing equipment and normally is one line of the recipe. The production sequence written in a recipe is not instructions specific to one manufacturing equipment, but operations that can be interpreted commonly within the unit group. The unit group is a set of manufacturing equipment having the same function. In the example of FIG. 16, manufacturing equipment A1 and A2 belong to unit group A, manufacturing equipment B1 belongs to unit group B, and manufacturing equipment C1 and C2 belong to unit group C, respectively. Manufacturing equipment A1, A2, B1, C1 and C2 correspond to machine agents 4A1, 4A2, 4B1, 4C1 and 4C2, respectively.

(2) Candidate manufacturing equipment.

The reservation agent has a list of candidate manufacturing equipment that can execute above part of a recipe (1). This list includes replies when the recipe of (1) is sent to a unit group using a multicast communication, or the like, or information about a specific manufacturing equipment in the recipe in advance, for example, the identifier of the machine agent. This list is rearranged in the order of use by a message from the outside within a reservation agent. The list is also updated as necessary, for example, such as when one or more manufacturing equipment are added.

In the embodiment of FIG. 16, when a manufacturing equipment is assigned by the prior scheduling of the product agent MY, reservation agent y-1 corresponding to the first line of the recipe RY has manufacturing equipment C2 only, which is the result of scheduling as a candidate. The agent does not search for other candidates when it is not necessary. Thus, when its reservation turn comes reservation agent y-1 makes a reservation if manufacturing equipment C2 is empty, i.e. available, or transfers its reservation turn to a subsequent reservation agent if the manufacturing equipment C2 is not empty, i.e. not available. On the other hand, reservation agent x-3 has two manufacturing equipment C1 and C2 on the candidate list that can execute the third line of the recipe RX of the product agent MX.

(3) Expected manufacturing time.

This is not a required data item but the manufacturing equipment can be selected more efficiently using this data item. First, the maximum expected manufacturing time is set. In addition, when the information of part recipe (1) is provided to a unit group, if the expected manufacturing time for an individual manufacturing equipment is obtained, the time is stored together with the information of the candidate equipment (2).

(4) Pointer to product agent.

The pointer is for communicating with the product agent that has a reservation. A reservation agent can ask for the reservation status of the previous stage,e.g. expected time until a work reaches the manufacturing stage, via the product agent.

Each reservation agent, instead of the product agent, enters in a queue provided in a unit group ahead of the current manufacturing work. How far creation of reservation agents developes depends on applications, such as preceding by a predetermined time, by predetermined lines in the receipe, by all of the recipe, etc. While the product agent moves with a corresponding product, or work to a controller where the machine agent resides, the reservation agent moves to a certain place in the queue. The queuing is in the order of receipt considering the priority of the product agent. The order can be changed by receiving a message between reservation agents or from the outside. In addition, the reservation agents have a mechanism for sending a message in the order of queuing.

A unit group collects manufacturing equipment having identical functions, and has the group communication function or multicasting function that sends messages to machine agents belonging to a unit group. The unit group is a group to which identical types of manufacturing equipment are classified. The manufacturing equipment having similar functions may vary in the processing time thereof or a number of the manufacturing equipment in the group may be able to execute processing of a certain recipe.

Upon receiving part of a recipe, a machine agent can answer whether its manufacturing equipment can execute that part of the recipe or not and the expected manufacturing time. The number of product agents that can own a machine agent at the same time is predetermined and normally is one. When the manufacturing equipment becomes empty or available, a machine agent notifies the reservation agent waiting at the head of the queue in a unit group to which the empty or available manufacturing equipment corresponds.

Figure 17:
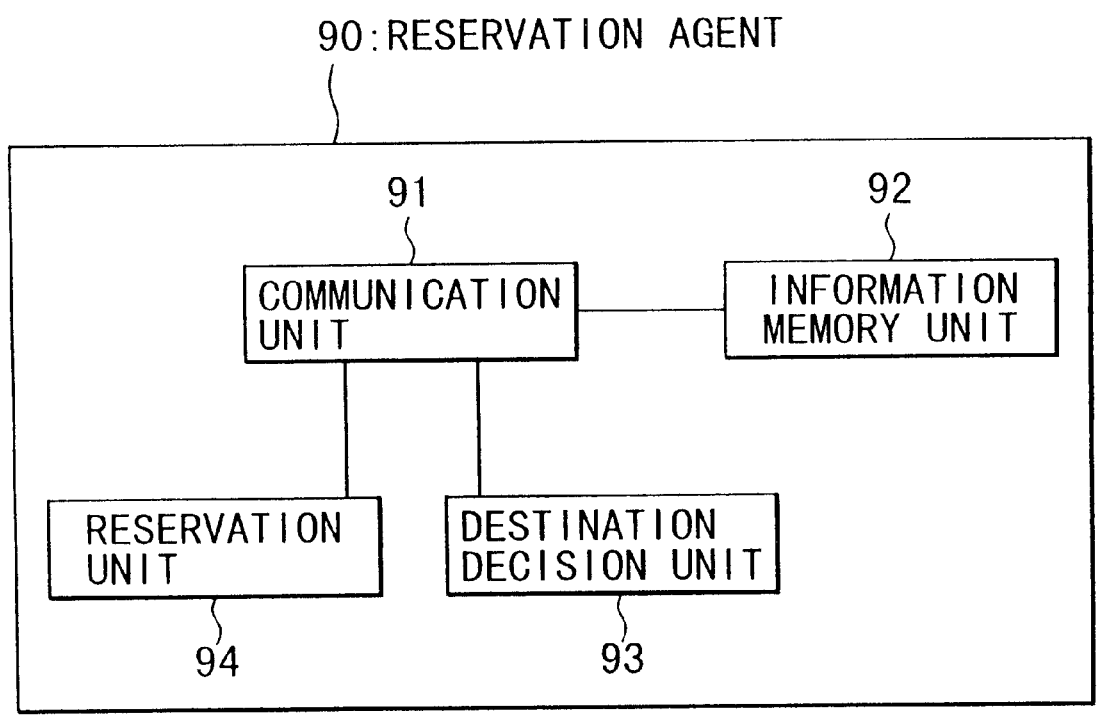
FIG. 17 is a block diagram depicting details of the reservation agent shown in FIG. 16.

FIG. 17 shows details of the structure of the reservation agent 90 shown in FIG. 16, wherein communication unit 91 manages communications between reservation agents, communications between a reservation agent and a product agent, communications between a reservation agent and machine agent, etc. Information memory unit 92 stores, for example, information on part of a recipe, candidates of manufacturing equipment, expected manufacturing time, and pointer to product agents, etc. Destination decision unit 93 determines the next destination of the product movement. Reservation unit 94 reserves a manufacturing equipment in the unit group.

Figure 18:
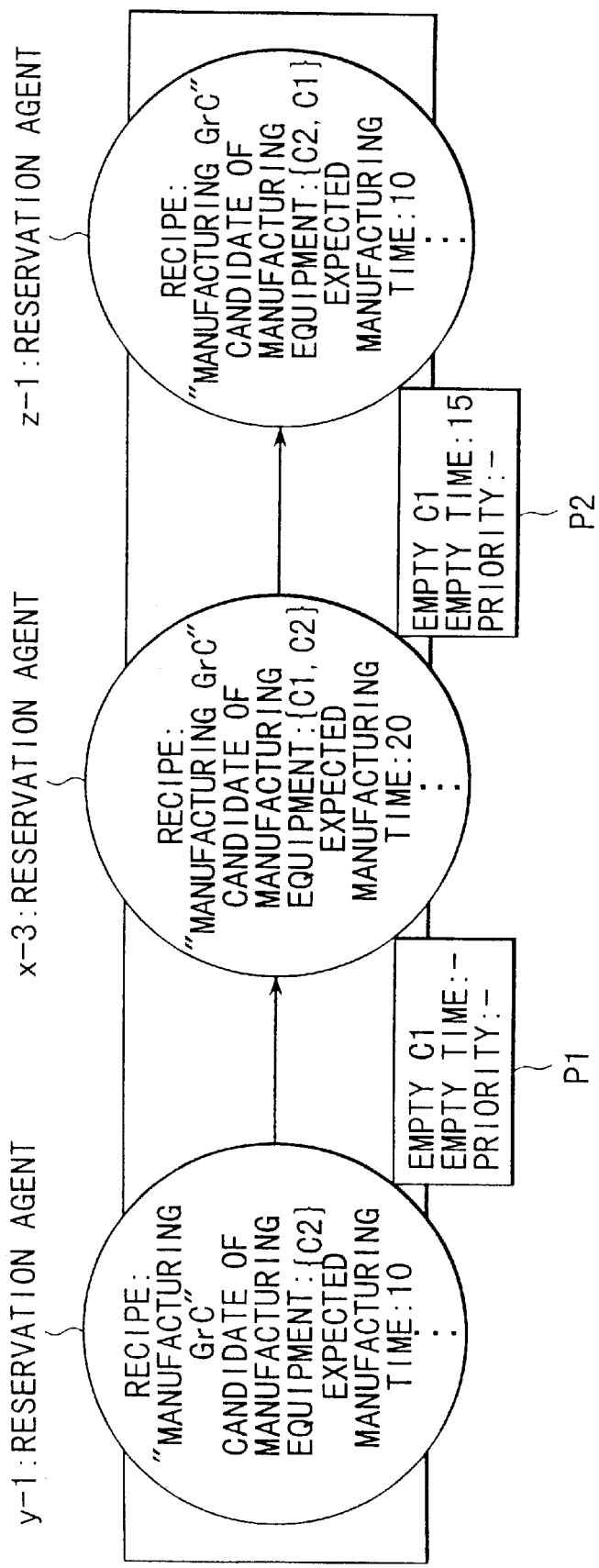
FIG. 18 is a diagram depicting operation of the sixth embodiment of FIG. 16.

Operation of the embodiment of FIG. 16 is described with reference to FIG. 18, which shows reservation agents that are queued. The reservation agents staying in queues for each unit group each has the right to select a manufacturing equipment in the order of its queueing place. The order of queuing is the order of receipt and considers the priority among various factors. In the example of FIG. 18, reservation agents have the right to select a manufacturing equipment in the order of reservation agent y-1, x-3, z-1. If a product corresponding to reservation agent y-1, which is at the head of the queue is being manufactured at the previous stage, the notification with condition P1 for manufacturing equipment C1 that has just become empty or available can be sent to the next reservation agent x-3 as a message. This is because that manufacturing equipment is not used immediately after becoming empty or available. In this case, the reservation agent can write the following conditions in the notification with conditions in addition to the name of the manufacturing equipment:

(1) Empty time.

If the reservation agent can get the expected manufacturing time, it can assume that the time until the corresponding product reaches the manufacturing equipment as empty or available time and can assign the manufacturing equipment to another product for the empty or available time.

(2) Priority of product agent.

If the expected manufacturing time cannot be obtained, it prevents that manufacturing equipment from being used earlier by a product agent having a lower priority, by writing the priority of the corresponding product agent. Similarly for agent X-3, product P2, and agent Z-1.

If the manufacturing equipment is not shown in its list of candidates of manufacturing equipment, the reservation agent transfers unconditionally that equipment to the next reservation agent. A reservation agent that accepts the notification with conditions sends a request for ownership to the machine agent and notifies the fact that it has acquired the ownership for that manufacturing equipment. It can now request manufacturing work.

Figure 19:
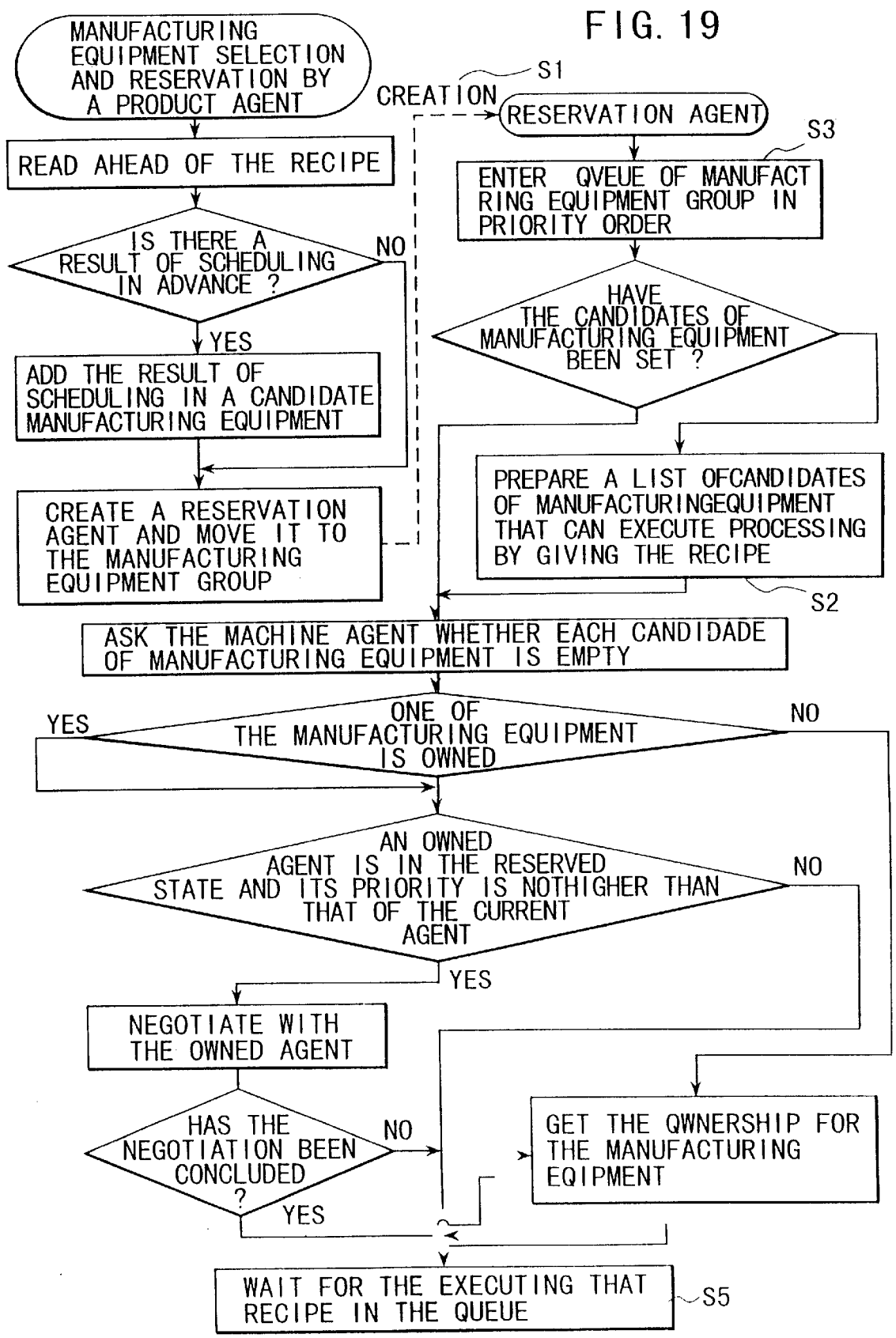
FIG. 19 is a flow chart depicting operation of the sixth embodiment of FIG. 16.

FIG. 19 shows operations when the product agent creates (Step S1) reservation agents to select and reserve required manufacturing equipment for each manufacturing sequence stage and reservation agent's queue for the machine agent. The agent changes its behavior depending on its own inside status or the receiving messages. Although the list of candidates of manufacturing equipment searched for in description (2) is arranged in the order to be used based on prescribed standards, the reservation agent changes this order when it receives the next message as shown below.

(1) Failure of manufacturing equipment.

If there is a failure of manufacturing equipment among the candidates,that manufacturing equipment is deleted from the candidates. If no candidate is left, another manufacturing equipment can be used by searching again within the unit group even if the pre-scheduled manufacturing equipment fails before use.

(2) Addition of manufacturing equipment.

By providing a recipe to a new machine agent, if a manufacturing equipment can be used for processing, that manufacturing equipment is added to the list of candidates.

(3) Other factors

The reservation agent may receive as a message a change of policy for arranging manufacturing equipment in the order to be used. Direct requests for rearranging and deleting candidates are also possible. The order of reservation agents in the queue (see process S3 in FIG. 19) may be changed by communication between reservation agents or by a message from another module, even when queuing is already started, for example, priority order of the product agents. For example, for a process not labelled in FIG. 19, reservation of a product agent whose deadline for delivery is close at hand can be preceded even if the priority of the product agent is the same as that of another product agent.

Process S5 in FIG. 19 shows the status where execution of the recipe of which the reservation agent is in charge is not reached no matter whether the ownership of that manufacturing equipment is acquired or not. If that manufacturing equipment becomes empty or available, the processing in this status is as shown in FIG. 20.

Figure 20:
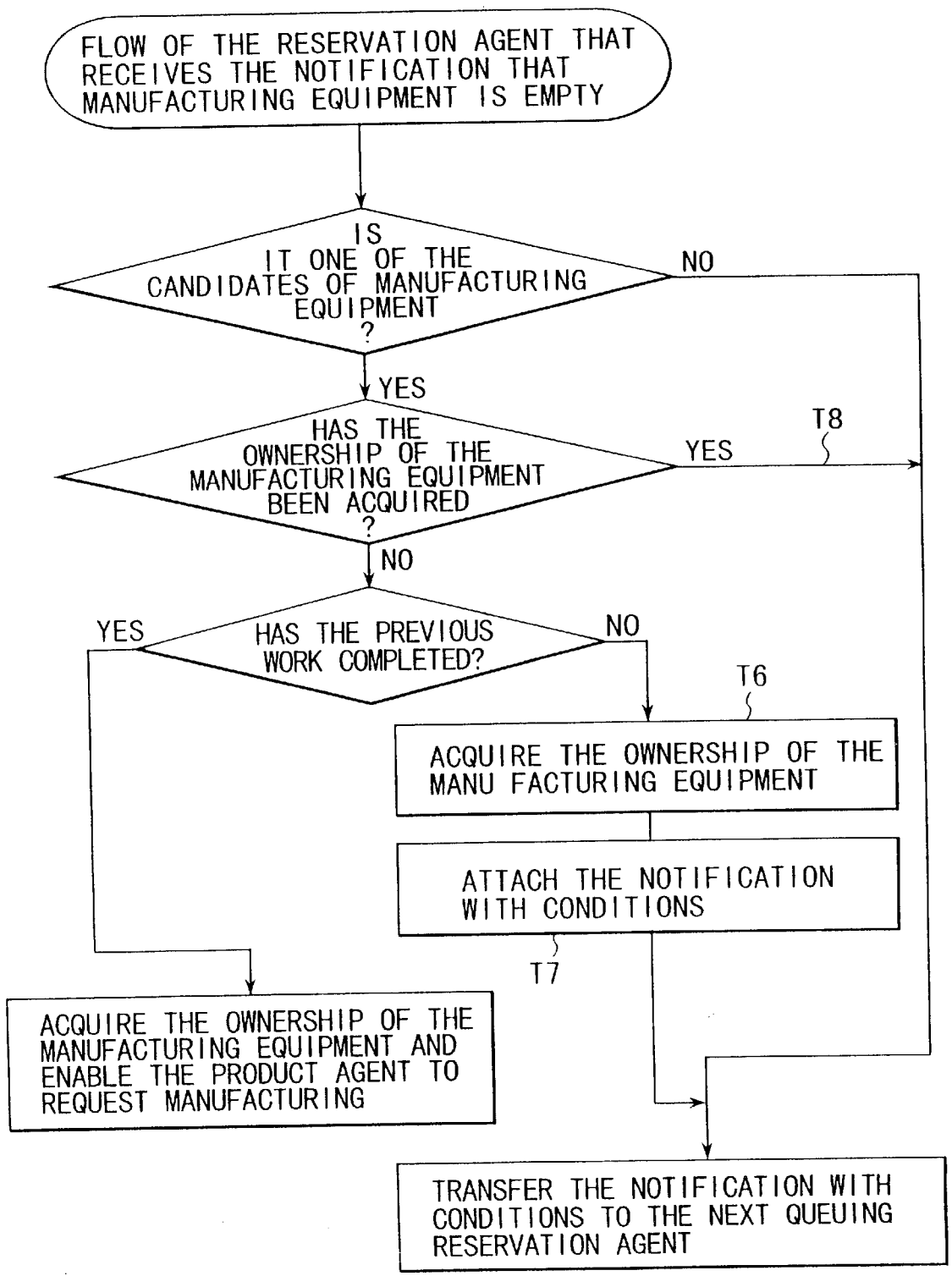
FIG. 20 is a flow chart depicting operation of the sixth embodiment of FIG. 16.

In FIG. 20, when the previous manufacturing work has not yet been finished, then that manufacturing equipment is not used immediately. Hence, for the time being, ownership is requested for that manufacturing equipment even when it is a candidate (see process T6 in FIG. 20). Then, the conditions are attached to the notification so that the manufacturing equipment may be used before a request is made by the first reservation agent, (process T7 in FIG. 20). Reservation agents queuing after the reservation that satisfies the conditions negotiate with the reservation agent that temporarily acquired ownership. Even a reservation agent that already acquired the ownership for the manufacturing equipment when a more desirable manufacturing equipment becomes empty or available (process T8 in FIG. 20), the notification with conditions may be rewritten for the manufacturing equipment whose ownership is owned by the reservation agent.

The sixth embodiment provides the following advantages and effects:

(1) If there is a result of prior static scheduling, that result can be considered while coordinating dynamic selection of manufacturing equipment by giving that information to the reservation agent.

(2) If there are more than two manufacturing equipment having identical function, they can be efficiently used because the reservation agents can enter a queue for each unit group and negotiate with each other.

(3) It is possible to handle dynamic changes due to the addition or failure of manufacturing equipment. A product that is going to use the failed manufacturing equipment can move smoothly to an alter native manufacturing equipment without disturbing the order of work.

Seventh Embodiment

Figure 21:
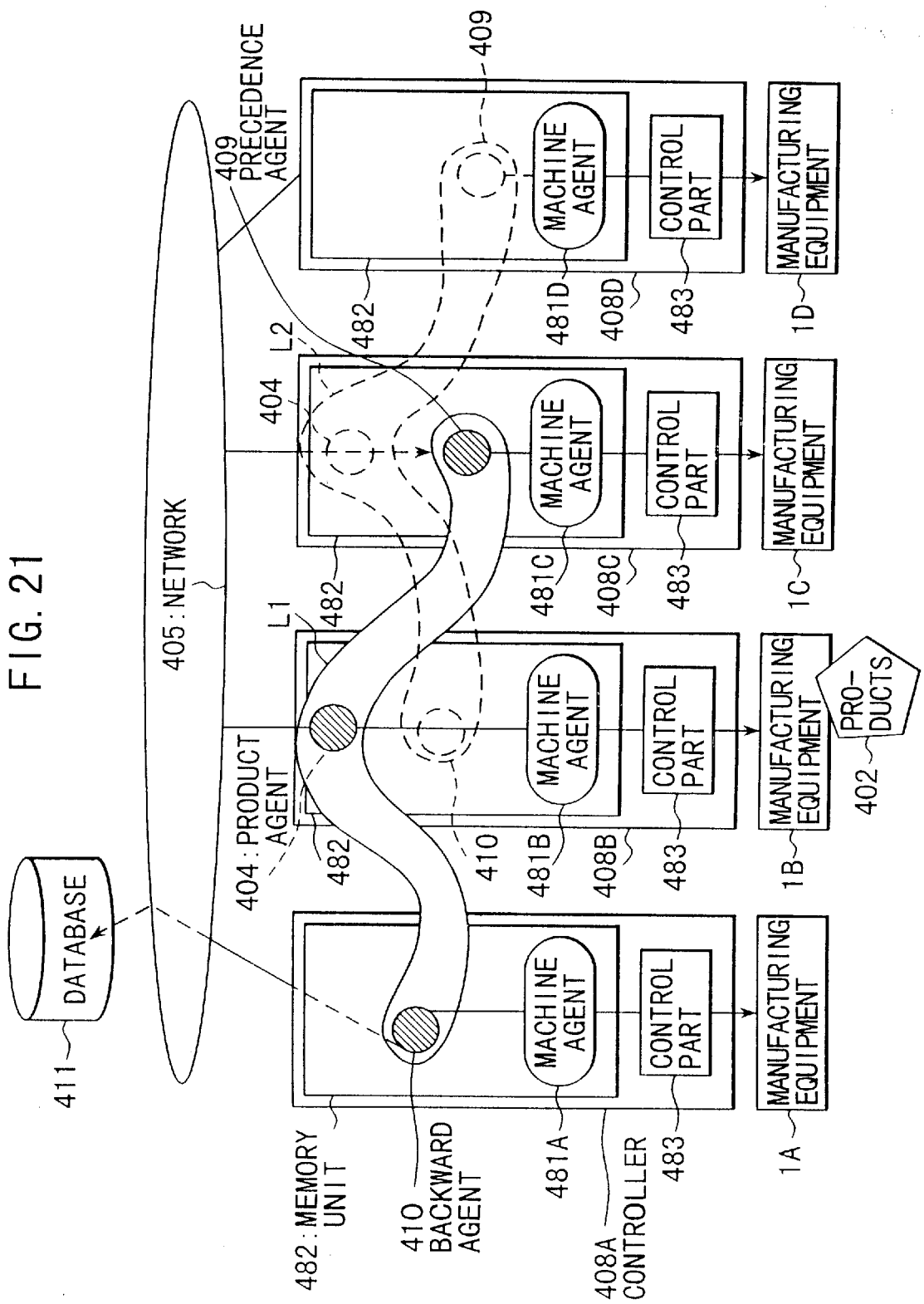
FIG. 21 is a diagram depicting a seventh illustrative embodiment

FIG. 21 shows a seventh embodiment wherein four units of manufacturing equipment 1A to 1D are provided. Controllers 408A to 408D are connected to units of manufacturing equipment 1A to 1D, respectively. Although in the embodiment shown in FIG. 21 one unit of manufacturing equipment is connected to each of the controllers, more than one manufacturing equipment may be connected to one controller. Product agent 404 selects required manufacturing equipment according to the production procedure, i.e. recipe, and request manufacturing work. Machine agents 481A to 481D are provided for the units of manufacturing equipment 1A to 1D on a one-to-one basis and have information specific to each manufacturing equipment, such as what type of manufacturing can be provided by the corresponding manufacturing equipment, and control each manufacturing equipment.

Memory unit 482 is provided in each controller 408A to 408D and supplies working areas for product agent 404, precedence agent 409, backward agent 410, and machine agents 481A to 481D. To memory areas of memory unit 482, product agents or precedence agents move, or in these areas, a backward agent is created or a product agent is recreated. Control part 483 is provided in each controller 408A to 408D and manages the control functions of each controller. Machine agents 481A to 481D work on each control part 483 and cause them to execute control functions. Precedence agent 409 selects and reserves a manufacturing equipment required for manufacturing work in later stages, and moves to the controller in which a machine agent corresponding to the reserved manufacturing equipment exists.

Backward agent 410 remains in the controller that controls manufacturing equipment used for manufacturing in the sequence earlier than the current manufacturing work and double manages the manufacturing history managed by the product agent 404. In addition, backward agent 410 monitors whether product agent 404 is normally operating or not and re-creates product agent 404 based on the manufacturing history owned thereby when product agent 404 goes down or fails.

If the product agent moves from one controller to another accompanying movement of a product from one manufacturing equipment to another following the production sequence, the precedence agent and the backward agent change their residing controller linked with the movement. Database 411 is provided for storing information history which backward agent 410 possesses. When production work advances to a predetermined stage, backward agent 410 may eliminate the production work by storing the history in the database 411.

Operation of the system of FIG. 21 is as follows. Product agent 404 inquires whether or not the work is possible by sending a message to the machine agent corresponding to the required manufacturing equipment to select the manufacturing equipment according to the production procedure. In this case, the message may be sent to several machine agents. An optimum machine agent which answers that work is possible should be selected. Product agent 404 moves to the controller in which the optimum machine agent resides. The movement is provided through network 405. Following the foregoing procedure, a product is transferred to the manufacturing equipment corresponding to the machine agent selected by the product agent.

When the required production work is completed at the destination of movement, the product agent searches for a manufacturing equipment required for the next stage of the production sequence similarly and executes manufacturing work. By repeating the procedures, the final product is produced.

As shown in FIG. 21, during the time that product 402 is being manufactured by manufacturing equipment 1B, the product agent 404 exists in controller 408B connected to manufacturing equipment 1B. During manufacturing by manufacturing equipment 1B, product agent 404 creates precedence agent 409 having a function of searching for and selecting the manufacturing equipment required for the next stage of the production sequence. Although precedence agent 409 is a kind of production agent in charge of the next stage of the production sequence, it may be implemented separately from the product agent as an agent having only a subset of the functions of the product agent, that is, manufacturing equipment selecting function only for the next stage of the production sequence. Precedence agent 409 has a function to select a manufacturing equipment required in a given production sequence and to move to the controller in which the machine agent corresponding to selected manufacturing equipment resides.

Backward agent 410 is a production agent in charge of the stage of the production sequence preceding the current stage and remains in the controller connected to the manufacturing equipment used in the preceding stage of the production sequence. Backward agent 410 double manages the manufacturing history managed by the product agent 404. It has a function to monitor whether the product agent 404 is operating normally. Backward agent 410 has a function to re-create the product agent 404 when it detects that the product agent goes down or fails. In this case, the number of precedence agents 409 and backward agents 410 existing for a product during the same period depends on the application. Precedence agents may exist for the stage of the production sequence which is a certain M (M being an integer) stage later than the current stage. Also, a backward agent may exist for the state a certain N (N being an integer) stage earlier than the current stage.

Figure 22:
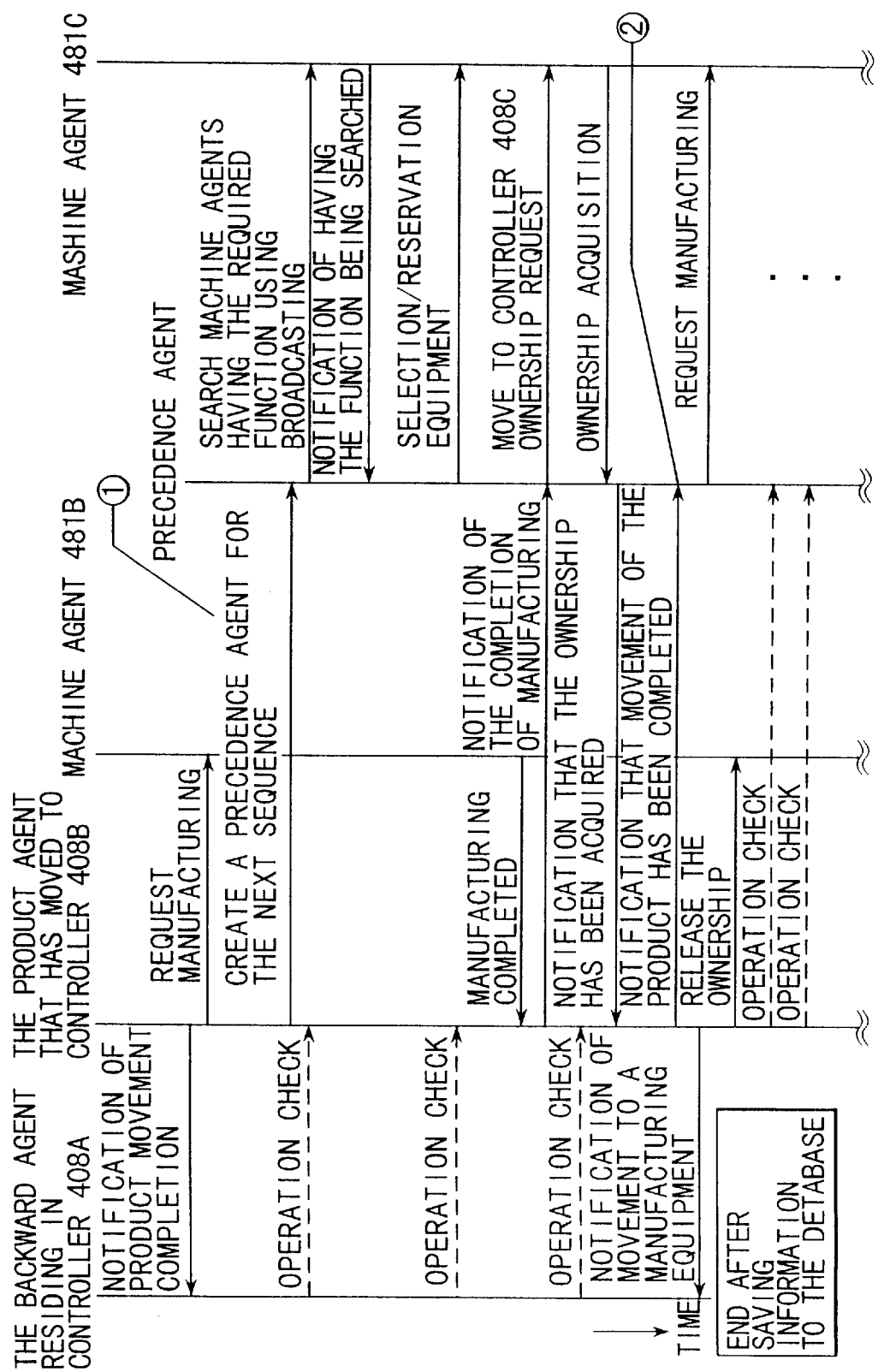
FIG. 22 is a diagram depicting operational sequence of the seventh embodiment of FIG. 21.

FIG. 22 is a time chart indicating the message flow in each agent, wherein a case is illustrated where both a precedence agent and a backward agent exist, starting at the time when the product agent has moved to controller 408B, following which a product is transferred to the manufacturing equipment.

Since a product agent is only waiting, basically, after it provides a message to machine agent 481B to request manufacturing work, the product agent creates a precedence agent that searches for a manufacturing equipment by reading ahead of the production sequence (see processing shown by (1) in FIG. 22). That is, the precedence agent selects and reserves a manufacturing equipment and moves to controller 408C.

When manufacturing work by manufacturing equipment 1B is completed and the product is transferred to manufacturing equipment 1C, precedence agent 409 that resides in controller 408C operates as a product agent (see processing shown by (2) in FIG.22), and the product agent that resides in controller 408B works as a backward agent. As shown above, when a product agent moves from one controller to another the precedence agent and backward agent change places linked with movement of the product agent. When the product agent resides in controller 408B, each agent is arranged as shown by the solid line L1 in FIG. 21. When the product agent is moved to controller 408C, each agent is arranged as shown by the broken line L2 in FIG. 21.

Figure 23:
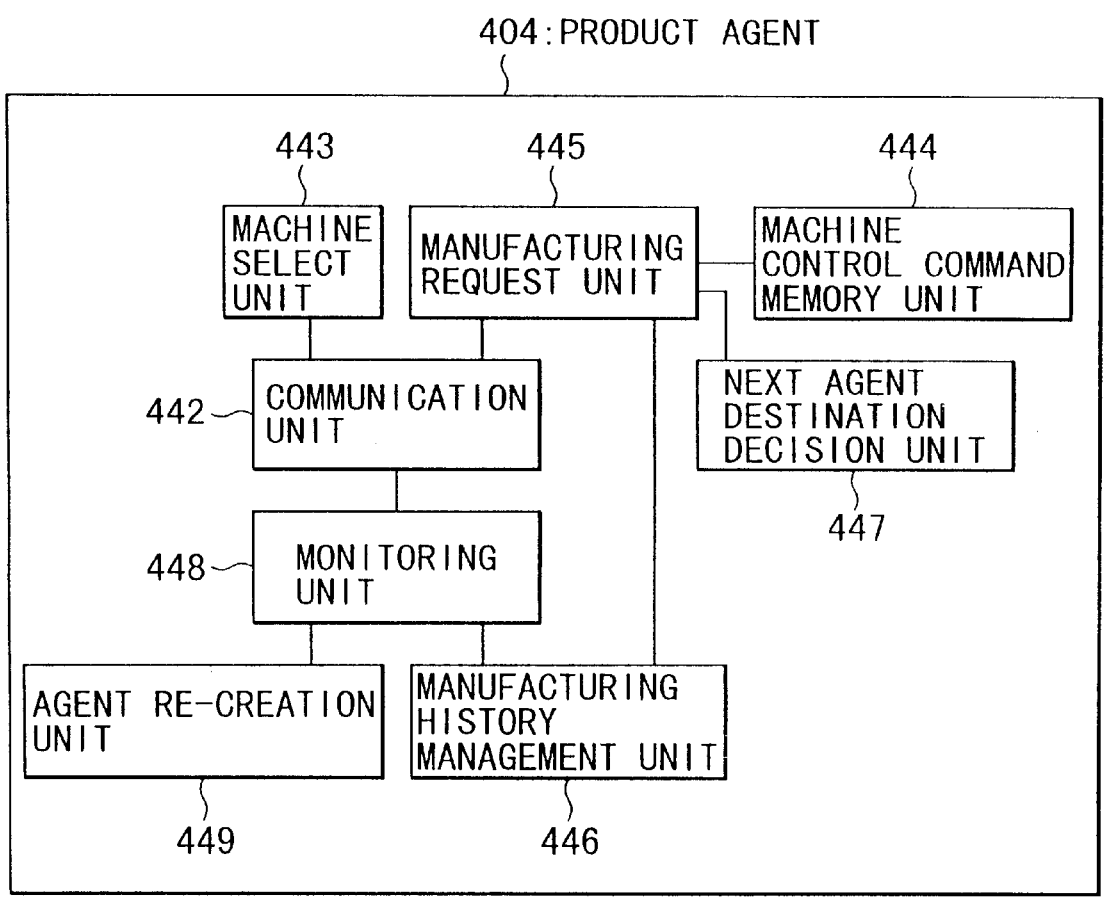
FIG. 23 is a block diagram depicting details of the product agent of FIG. 21.

FIG. 23 shows details of the structure of the product agent of FIG. 21, wherein communication unit 442 executes communications between product agents, communications between a product agent and a machine agent, etc. Machine selection unit 443 selects a manufacturing equipment required for the production sequence. Machine control command memory unit 444 stores machine control command in a suitable form for manufacturing equipment use. Manufacturing request unit 445 requests the manufacturing equipment to provide manufacturing work.

The request for manufacturing work is made by reading a machine control command corresponding to the requested work from the machine control command memory unit 444, and providing the command to a machine agent. Manufacturing history management unit 446 manages the manufacturing history for the products. Next agent destination decision unit 447 determines the next destination of movement of the agent. Monitoring unit 448 monitors whether or not the product agent is operating normally. When a product agent goes down, agent re-creation unit 449, using the results of the monitoring by monitoring unit 448, re-creates the product agent based on the manufacturing history managed and stored in the manufacturing history management unit 446. Agent re-creation unit 449 also creates a precedence agent from the product agent.

As described, the product agent creates the precedence agent. Copying the product agent creates the precedence agent. In the embodiment of FIG. 23, the function of the precedence agent is managed by communication unit 442, machine select unit 443 and the next agent destination decision unit 447. Hence, when the product agent operates as a precedence agent, only communication unit 442, machine selection unit 443 and next agent destination decision unit 447 are working in the agent. In addition, since the precedence agent is an agent having only the function of selecting a machine for the next stage of the production sequence, the precedence agent need not be a complete copy of the product agent. For example, the precedence agent may be implemented separately from the product agent as an agent having only subset functions of the product agent, that is, of communication unit 442, machine selection unit 443 and next agent destination decision unit 447.

Since it is product agent remaining in the controller corresponding to the manufacturing equipment used in the preceding stage of the production sequence, the backward agent may be configured in the same manner as the product agent. However, if it operates as a backward agent, only communication unit 442, manufacturing history management unit 446, monitoring unit 448 and agent re-creation unit 449 are operating. The number of existing precedence agents 409 and backward agents 410 may vary according to the progress of the production work.

The seventh embodiment provides the following advantages and effects:

(1) In a production system using product agents, the precedence agent that selects a manufacturing equipment for later stages than the current stage of manufacturing in advance, and a backward agent that remains behind the product agent and double manages the working history together with the product agent, are provided.

The existence of the precedence agent shortens the production processing time because dynamic selection of manufacturing equipment can be done efficiently.

The existence of the backward agent enables checking of the operation of the product agent locally while maintaining load distribution or re-creating the production agent when it goes down, because several agents double manage the manufacturing history. This improves the reliability of the system.

(2) Because of the variable number of existing precedence agents and backward agents, the optimum number of precedence agents and backward agents is achieved according to the progress of the production.

(3) Even if it becomes no longer necessary for the backward agent to remain after production work advances to a predetermined stage of the production sequence, the manufacturing history can be continued.

As described the seventh embodiment improves the production system using the various agents.

Eighth Embodiment

Figure 24:
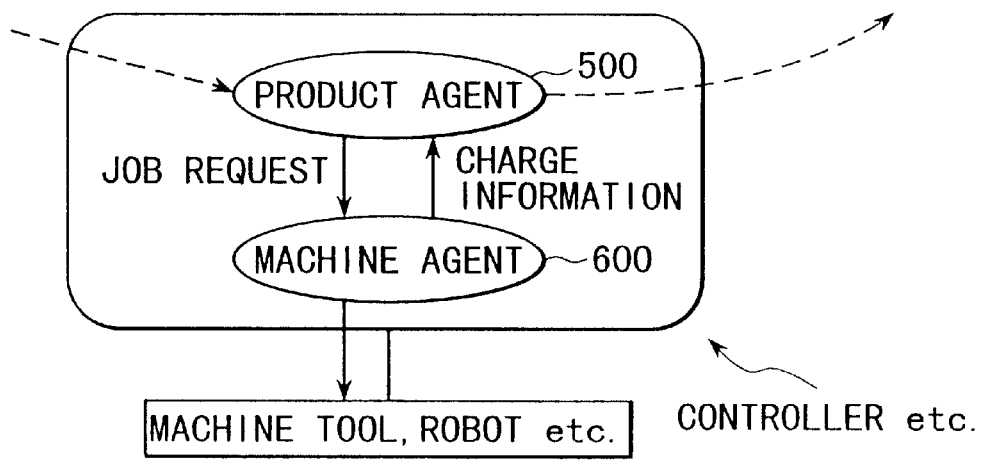
FIG. 24 is a diagram depicting an eighth illustrative embodiment of the invention.

FIG. 24 shows the eighth embodiment wherein product agent 500, for example, is assigned to each product and moves between connected controllers via communication lines following the product. Machine agent 600 is provided corresponding to manufacturing equipment in charge of production and/or individual units for processing facilities, and resides, for example, in the controllers of the manufacturing equipment. Product agent 500 sends a job request to machine agent 600. Charge information is supplied from machine agent 600 in response to the request from product agent 500. Machine agent 600 has the following functions to supply the charge information:

(1) a function to manage the depreciation information on manufacturing equipment that the machine agent manages.

(2) a function to measure the period of time that the product agent 500 uses the manufacturing equipment.

(3) a function to calculate the cost generated by the use of the manufacturing equipment for the product agent 500 using the depreciation information and the time used information.

Figure 25:
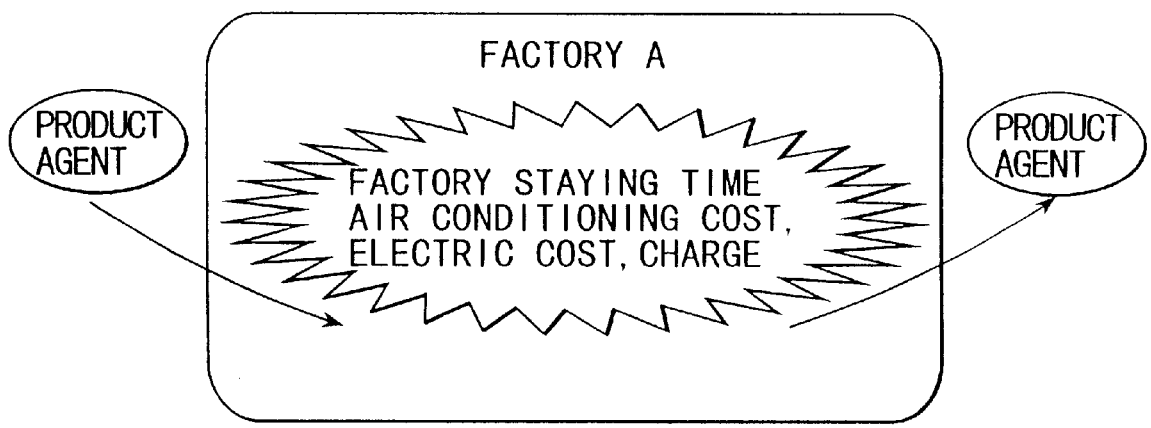
FIG. 25 is a diagram depicting a process for calculating the total cost using a product agent.

FIG. 25 explains a process for calculating the total cost of the use of the product agent. For product agent 500, electric cost and amount of assessment for ground rent are calculated from the amount of time used in the manufacturing process, that is the factory staying time. The amount of assessment includes the amount of depreciation for the facilities in the factory and the administration expenses.

In addition, there is shown in the foregoing embodiment, a configuration wherein product agent 500 inquires about the manufacturing cost to machine agent 600 in charge of each manufacturing equipment. However, the invention is not so restricted, but, advantageously, may adapt a configuration wherein a moderator agent, dedicated to executing cost management, is provided and the moderator agent inquires of the machine agent information about the manufacturing cost of each product agent.

The eighth embodiment provides the following advantages and effects:

(1) The machine agent calculates the cost by using relevant manufacturing equipment for the product agent, using depreciation information on the manufacturing equipment that the machine agent manages, and using the time that the product agent uses on the manufacturing equipment. The product agent corresponds to individual products on a one-to-one basis. Thus, the manufacturing cost of the individual products can be easily calculated.

(2) Since the product agent collects the cost data from the machine agent, the manufacturing cost for each individual product can be readily calculated. The machine agent collects and retains the various data.

(3) Since the product agent inquires about the cost information of the machine agent, the product agent can collect cost information for only the required product.

As described, the invention advantageously provides a production system and manufacturing equipment selecting method for the system that can be flexibly adapted to provide for small scale production of of multiple items. Also, advantageously, the invention provides for easy and reliable addition and deletion of manufacturing equipment. Moreover, failures of manufacturing equipment can be easily handled reliably and without adverse effect on the production.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A production system that produces desired products by applying manufacturing work to products using manufacturing equipment in accordance with a predetermined manufacturing sequence, said system comprising:

one or more control machines to control manufacturing operation of the manufacturing equipment;

one or more control computers to control the one or more control machines;

one or more memory units provided in the one or more control computers that supply working areas for each product agent and machine agent;

a control network to which the one or more control machines and control computers are connected;

the product agent being provided for a product on a one-to-one basis and having a recipe describing a manufacturing sequence for a product;

the machine agent being provided for a manufacturing equipment on a one-to-one basis and having a function list showing functions assigned to a corresponding manufacturing equipment; and wherein the product agent interprets description of the recipe and broadcasts a manufacturing request to the machine agent, and wherein the machine agent returns a reply if it can accept the manufacturing request based on its own function list and content of the transmitted request, and wherein the product agent selects a manufacturing equipment to which manufacturing work is to be requested based on the reply from the machine agent.

2. A production system that produces desired products by applying manufacturing work to products using manufacturing equipment in accordance with a predetermined manufacturing sequence, said system comprising:

one or more control machines to control manufacturing operation of the manufacturing equipment;

one or more control computers to control the one or more control machines;

one or more memory units provided in the one or more control computers that supply working areas for each product agent and machine agent;

a control network to which the one or more control machines and control computers are connected;

the product agent being provided for a product on a one-to-one basis and having a recipe describing a manufacturing sequence for a product;

the machine agent being provided for a manufacturing equipment on a one-to-one basis and having a function list showing functions assigned to a corresponding manufacturing equipment; and wherein the product agent interprets description of the recipe and broadcasts a manufacturing request to the machine agent, and wherein the machine agent returns a reply if it can accept the manufacturing request based on its own function list and content of the transmitted request, and wherein the product agent selects a manufacturing equipment to which manufacturing work is to be requested based on the reply from the machine agent;

wherein each of the one or more control machines are provided with a second memory unit that supplies a working area for the machine agent, and wherein the machine agent is disposed on the control machine side of the system.

3. The system of claim 2, wherein a plurality of manufacturing equipment provide a total of one function, and wherein one machine agent controls the plurality of manufacturing equipment.

4. The system of claim 2, further comprising a moderator agent which adds to a function table a function indicating adding of a manufacturing equipment when a manufacturing equipment is newly added and which deletes from the function table a function indicating the presence of the one manufacturing equipment when such manufacturing equipment is deleted.

5. The system of claim 2, wherein said recipe describes stages of the manufacturing sequence; and wherein a function name and work instruction are described in each stage, the function name showing which manufacturing equipment has what functions for manufacturing by interpreting the work instruction; and the work instruction indicating the contents of the work instruction provided to the manufacturing equipment.

6. A production system that produces desired products by applying manufacturing work to products using manufacturing equipment in accordance with a predetermined manufacturing sequence, said system comprising:

one or more control machines to control manufacturing operation of the manufacturing equipment;

one or more control computers to control the one or more control machines;

one or more memory units provided in the one or more control computers that supply working areas for each product agent and machine agent;

a control network to which the one or more control machines and control computers are connected;

the product agent being provided for a product on a one-to-one basis and having a recipe describing a manufacturing sequence for a product;

the machine agent being provided for a manufacturing equipment on a one-to-one basis and having a function list showing functions assigned to a corresponding manufacturing equipment; and wherein the product agent interprets description of the recipe and broadcasts a manufacturing request to the machine agent, and wherein the machine agent returns a reply if it can accept the manufacturing request based on its own function list and content of the transmitted request, and wherein the product agent selects a manufacturing equipment to which manufacturing work is to be requested based on the reply from the machine agent;

wherein the product agent multicasts the manufacturing request to a specific machine agent.

7. A production system that produces desired products by applying manufacturing work to products using manufacturing equipment in accordance with a predetermined manufacturing sequence, said system comprising:

one or more control machines to control manufacturing operation of the manufacturing equipment;

one or more control computers to control the one or more control machines;

one or more memory units provided in the one or more control computers that supply working areas for each product agent and machine agent;

a control network to which the one or more control machines and control computers are connected;

the product agent being provided for a product on a one-to-one basis and having a recipe describing a manufacturing sequence for a product;

the machine agent being provided for a manufacturing equipment on a one-to-one basis and having a function list showing functions assigned to a corresponding manufacturing equipment; and wherein the product agent interprets description of the recipe and broadcasts a manufacturing request to the machine agent, and wherein the machine agent returns a reply if it can accept the manufacturing request based on its own function list and content of the transmitted request, and wherein the product agent selects a manufacturing equipment to which manufacturing work is to be requested based on the reply from the machine agent;

further comprising a moderator agent having a function table to perform integrated management of information concerning functions of a plurality of manufacturing equipment; and wherein said moderator agent notifies the product agent of the machine agents that can accept the manufacturing request when a product agent requests such manufacturing; and wherein the product agent selects an optimum manufacturing equipment from among the notified machine agents.

8. A production system that produces desired products by applying manufacturing work to products using manufacturing equipment in accordance with a predetermined manufacturing sequence, said system comprising:

one or more control machines to control manufacturing operation of the manufacturing equipment;

one or more control computers to control the one or more control machines;

one or more memory units provided in the one or more control computers that supply working areas for each product agent and machine agent;

a control network to which the one or more control machines and control computers are connected;

the product agent being provided for a product on a one-to-one basis and having a recipe describing a manufacturing sequence for a product;

the machine agent being provided for a manufacturing equipment on a one-to-one basis and having a function list showing functions assigned to a corresponding manufacturing equipment; and wherein the product agent interprets description of the recipe and broadcasts a manufacturing request to the machine agent, and wherein the machine agent returns a reply if it can accept the manufacturing request based on its own function list and content of the transmitted request, and wherein the product agent selects a manufacturing equipment to which manufacturing work is to be requested based on the reply from the machine agent;

further comprising a management computer provided on said control network; and wherein said product agent resides in said management computer without movement and requests manufacturing work to said machine agent in said control computer by communication therewith.

9. A manufacturing equipment selecting method comprising the following sequence of steps:

a procedure in which a product agent reads a recipe, detects a function name required for a manufacturing work, and sends a request for use of a manufacturing equipment to a machine agent;

a procedure in which said machine agent receives the request for use and permits said product agent to send a request to own a corresponding manufacturing equipment when said manufacturing equipment has said function contained in said request for use and is not being used;

a procedure in which said product agent selects an optimum machine agent to permit said product agent to own a manufacturing equipment and acquire ownership;

a procedure in which said product agent that has acquired ownership to send said recipe to said machine agent;

a procedure in which said machine agent interprets said recipe, controls said corresponding machine equipment to cause execution of manufacturing work, and sends results of manufacturing work to said product agent;

a procedure in which said product agent notifies said machine agent of release of ownership; and a procedure in which said machine agent releases ownership of said corresponding manufacturing equipment.

10. A production system that produces desired final products by applying manufacturing work to raw products using one or more manufacturing equipment in accordance with a predetermined production sequence, the system comprising:

one or more controllers to each of which one of the said one or more manufacturing equipment is connected;

a memory unit provided in each of said one or more controllers that supplies a working area for a product agent;

a network to which each of said one or more controllers is connected; and a production order management part to manage production of the final product via communication with the one or more controllers and connected to the network;

said product agent provided for a product on a one-to-one basis and having a recipe describing a manufacturing sequence for the raw product selecting one of the one or more manufacturing equipment required for the manufacturing work according to the recipe, requesting manufacturing work to the one or more controllers to which the selected one of the one or more manufacturing equipment is connected and, upon detecting a failure or congestion in that selected one manufacturing equipment, notifying the production order management part of said detection; and said production order management part suppressing production of the raw product related to the manufacturing work by the selected one manufacturing equipment whose failure or congestion was detected and preceding production of another raw product not related to the manufacturing work by the selected manufacturing equipment.

11. The system of claim 10, wherein said product agent detects a failure or congestion of a manufacturing equipment by itself or by notification from another product agent and coordinates a reservation schedule for the one or more manufacturing equipment in accordance with a failure or congestion occurrence.

12. A production system that builds up desired products by applying manufacturing work to the products using manufacturing equipment in accordance with a predetermined production sequence, said system comprising:

one or more controllers connected to a manufacturing equipment;

a memory unit provided in each of said one or more controllers, said memory unit having a working area for a product agent;

a network connected to each of said one or more controllers;

management means for managing production of said products via communication with said one or more controllers and connected to said network;

said product agent being provided for products on a one-to-one basis, and having a recipe describing a manufacturing sequence for the products, and selecting a manufacturing equipment required for manufacturing work according to the recipe, and requesting manufacturing work from the one or more controllers; and wherein first and second products are produced under management of said management means and wherein manufacturing of the first product precedes the manufacturing of the second product, the production sequence for the first and second products being the same at least up to a stage where manufacturing work on the first product has advanced, and in case priority of the second product is higher than that of the first product, the product agents are replaced with each other between the first and second products.

13. A production system that produces desired products by applying manufacturing work to the products using manufacturing equipment in accordance with a predetermined production sequence, said system comprising:

one or more controllers connected to the manufacturing equipment;

a memory unit that supplies a working agent for a product agent;

a queue memory unit that supplies an area in which a reservation agent that reserves a manufacturing equipment ahead of a current manufacturing is queued;

a network connected to said one or more controllers; and management means for managing production of said products via communication with said one or more controllers and connected to said network;

said product agent having a recipe describing a manufacturing sequence for the product, the reservation agent reserving a manufacturing equipment required for manufacturing work according to the recipe, and the product agent requesting manufacturing work through said management means to the one or more controllers.

14. The system of claim 13, wherein unit groups are formed, in each of which a plurality of manufacturing equipment having identical functions are arranged; a queue being provided for each unit group, and wherein a queuing reservation agent reserves a manufacturing equipment that becomes available when a manufacturing equipment in a particular unit group becomes available.

15. The system of claim 13, wherein said reservation agent has priority and changes its order of queuing according to said priority.

16. The system of claim 13, wherein some of the reservation agents reserve only specific ones of the manufacturing equipment among said reservation agents, and wherein one of the reservation agents makes a reservation when a specific manufacturing equipment is available when its reservation turn is reached, and when not available, the reservation agent assigns its reservation turn to a subsequent reservation agent.

17. The system of claim 13, wherein information on scheduling result is provided to a reservation agent when the result of prior static manufacturing scheduling exists.

18. A production system that produces desired products by applying manufacturing work to the products using manufacturing equipment in accordance with a predetermined production sequence, the system comprising:

one or more controllers connected to a manufacturing equipment;

a memory unit provided in each of the one or more controllers, said memory unit supplying a residing area for a product agent, a precedence agent, and a backward agent;

a network connected to the one or more controllers;

the product agent being provided for a product on a one-to-one basis, selecting a required manufacturing equipment according to a production procedure, and moving to the one or more controllers connected to the manufacturing equipment to which manufacturing work is requested;

the precedence agent reserving a manufacturing equipment required for manufacturing work in a sequence stage ahead of a current stage, and moving to a controller connected to a reserved manufacturing, equipment;

the backward agent remaining in a controller connected to the manufacturing equipment used in a previous stage of a production sequence to a current stage, double managing a manufacturing history managed by a product agent, monitoring whether the product agent operates normally or not, and re-creating the product agent based on the manufacturing history in case the product agent goes down; and when the product agent moves one controller to another accompanying the movement of the product from one manufacturing equipment to another according to the progress of the production sequence, the precedence agent and backward agent change controllers in which they reside, respectively.

19. The system of claim 18, wherein the number of said precedence agent and the number of said backward agent that reside at the same time are variable.

20. The system of claim 18, wherein said backward agent clears it own manufacturing history by saving the history in a database when the production has advanced to a predetermined stage of the production sequence.

21. A production system where production of a relevant product using a relevant manufacturing equipment is performed by coordinating a product agent responsible for a product and a machine agent that controls the manufacturing equipment, wherein said machine agent comprises:

a depreciation information management part for a manufacturing equipment that the machine agent manages;

means for measuring the time that said product agent uses said relevant manufacturing equipment; and means for calculating the cost of using the relevant manufacturing equipment by the product agent using a relevant depreciation information and a relevant time.

22. The system of claim 21, wherein said product agent totals the cost by collecting cost data from said machine agent.

23. The system of claim 21, wherein said product agent inquires about cost information to said machine agent.

* * * * *